United States Patent
Nishibata et al.

(10) Patent No.: US 6,923,577 B2
(45) Date of Patent: Aug. 2, 2005

(54) SCROLL THRUST BEARING

(75) Inventors: Tomoya Nishibata, Kawachinagano (JP); Hideaki Ito, Nara (JP); Yutaka Morimoto, Ibaraki (JP)

(73) Assignee: Koyo Machine Industries Co., Ltd., Osaka (JP)

( * ) Notice: Subject to any disclaimer, the term of this patent is extended or adjusted under 35 U.S.C. 154(b) by 0 days.

(21) Appl. No.: 10/833,054

(22) Filed: Apr. 28, 2004

(65) Prior Publication Data

US 2004/0202394 A1 Oct. 14, 2004

Related U.S. Application Data

(62) Division of application No. 09/584,769, filed on Jun. 1, 2000, now abandoned.

(30) Foreign Application Priority Data

| Jun. 7, 1999 | (JP) | ............................................ | 11-159501 |
| Sep. 7, 1999 | (JP) | ............................................ | 11-253673 |

(51) Int. Cl.[7] ............................................ F16C 19/30
(52) U.S. Cl. ........................... 384/590; 384/619; 74/86; 418/55.1
(58) Field of Search ................................ 384/445, 590, 384/618, 619, 620; 74/86; 418/55.1, 55.3

(56) References Cited

U.S. PATENT DOCUMENTS

| 419,089 A | 1/1890 | Wagner |
| 3,740,108 A | 6/1973 | Fernlund |
| 4,715,733 A | 12/1987 | Rood |
| 5,752,775 A | 5/1998 | Tsutsui et al. |
| 5,846,000 A | 12/1998 | Tanishiki |
| 6,123,605 A | 9/2000 | Yano |
| 6,152,712 A | 11/2000 | Ueda |

FOREIGN PATENT DOCUMENTS

JP    2001-82489    3/2001

*Primary Examiner*—William C. Joyce
(74) *Attorney, Agent, or Firm*—Rader, Fishman & Grauer PLLC

(57) ABSTRACT

A scroll thrust bearing having both-end conical rollers are rolling elements, being low in cost, high in precision, large in load capacity, and excellent in durability. A plurality of both-end conical rollers are held rotatably between a pair of bearing plates, and the relation of the scroll swirl radius (R) of both-end conical roller and the dimension (H) between opposite tracks of the both bearing plates is set in a range of 1<H/R<5. As compared with the preset scroll swirl radius (R) of both-end conical roller, the section curvature in the contact portion with the tracks of the both bearing plates of the conical surfaces of the both-end conical roller is kept as small as possible in a practical range, so that the surface pressure acting on the conical surfaces of the both-end conical roller is kept as small as possible.

10 Claims, 28 Drawing Sheets

SCROLL THRUST BEARING

RELATED APPLICATION

This application is a divisional application of application Ser. No. 09/584,769, filed on Jun. 1, 2000 now abandoned.

BACKGROUND OF THE INVENTION

1. Field of the Invention

The present invention relates to a scroll thrust bearing, and more particularly to a structure of a scroll thrust bearing having a plurality of both-end conical rollers as rolling elements, and preferably used for thrust force support structure in, for example, a scroll type compressor.

2. Description of the Related Art

The scroll type compressor is a kind of rotary compressors, and it is small in size and free of valve mechanism, and fluid compression is continuous, and as compared with the conventional reciprocating compressors, torque fluctuations and vibrations are small and high speed operation is possible, and hence it is recently applied widely.

This type of compressor has a thrust force support structure for enabling scroll driving. The support structure composes a kind of thrust bearing, and steel balls or other spheres are used as rolling elements. However, such spheres are supported in point contact, and are inferior in durability, not withstanding for long in the conditions of high speed and heavy load, and there were problems in life and others.

To solve these problems, a scroll type compressor having a thrust force support structure as shown in FIG. 28(a) has been proposed (for example, Japanese Laid-open Utility Model No. 61-82086 and Japanese Laid-open Patent No. 62-107284).

The scroll of this compressor is composed as shown in the drawing, that is, a fixed scroll member (c) having a volute (b) is fixed in a housing (a), and a swirl scroll member (e) having a volute (d) engaged with the volute (b) is supported by a thrust force support structure (f) so as to be free to swirl or revolve, and this swirl scroll member (e) is driven and coupled to a drive source not shown through a crankpin (g).

The support structure (f) is formed as a kind of thrust bearing, and a plurality of pockets (h), (i) are disposed oppositely, at the inner side of the housing (a) and the confronting side of the swirl scroll member (e), and both-end conical rolling elements, that is, so-called both-end conical rollers K are freely disposed between the both pockets (h) and (i).

By the rotary drive of the crankpin (g), the swirl scroll member (e) swirls or revolves without rotating about the fixed scroll member (c), and therefore the fluid gas sucked in through a suction port (j) is compressed in a compression chamber formed between the volutes (b) and (d), and is discharged through a discharge port K.

In this case, each both-end conical roller K captured between the pockets (h), (i) makes a rolling motion in linear contact state with flat bottoms (m), (n) of the pockets (h), (i) at its conical surfaces (Ka), (Kb) as schematically shown in FIG. 28(b). These both-end conical rollers K, (R), ... arrest relative rotation of the both scroll members (c), (e) when the swirl scroll member (e) swirls on the fixed scroll member (c) (the swirl route coincides with the route indicated by arrow (o) in FIG. 28(b)).

According to the thrust force support structure (f) having such both-end conical rollers K, K, ..., as compared with the conventional structure using spherical rolling elements, the durability is enhanced by far, and it withstands operation at high speed and heavy load for a long period.

In spite of such excellent durability, however, the scroll type compressor having such thrust force support structure (f) is not realized yet mainly because the assembling and manufacturing technology of the thrust force support structure (f) is not established yet.

Specifically, since the scroll swirl radius in the scroll structure of the compressor, that is, the radius of the swirl route (o) in the thrust force support structure (f) is equal to the generator length of conical surfaces (Ka), (Kb) of the both-end conical roller K, the size of the both-end conical roller K itself is very small owing to its structural reason. Besides, in the thrust force support structure (f) of the scroll swirl unit shown in FIG. 28(a), a relative dimensional precision of high level and a high assembling precision are required between constituent elements. On the other hand, as a machine element, mass productivity is also demanded in this kind of thrust force support structure (f).

In such structure, however, in the assembling process of the scroll structure and assembling process into the scroll structure, only a slight vibration may disturb the configuration of the both-end conical rollers K, K, .... It is hence difficult to array all both-end conical rollers K, K, ... in a specific direction and assemble into the track, and mass production by automatic assembling is not yet perfect structurally.

Further, as mentioned above, the both-end conical roller K itself is advantageous in that the load capacity is larger than in the conventional spherical rolling element, but in the both-end conical rollers K actually assembled in the scroll type compressor, since there is a relation with other bearing constituent members, there has been a room for further improvement in the load capacity and durability.

SUMMARY OF THE INVENTION

It is hence a primary object of the invention to present a novel scroll thrust-bearing solving the problems of the prior art.

It is other object of the invention to present a scroll thrust bearing having both-end conical rollers as rolling elements, much lower in cost and higher in precision as compared with the prior art, large in load capacity, and excellent in durability.

It is another object of the invention to present a scroll thrust bearing having both-end conical roller bearings of long life, and notably extended in the life of the bearing.

It is a feature of the structure of the scroll thrust bearing of the invention that the both-end conical rollers are composed of conical bodies having a pair of conical surfaces matched coaxially, in which the relation of the scroll swirl radius (R) and the dimension (H) between opposite tracks of the both bearing plates is set in a relation of 1<H/R<5.

Preferably, the pair of conical surfaces of the both-end conical roller are bonded at the bottom, and the bonded bottom of the both conical surfaces has a junction surface including an arc section continuous to the both conical surfaces, so that the contact length in the generator direction of the both conical surfaces to the track on the both bearing plates is set to be as small as possible. Preferably, the conical surface of the both-end conical roller is processed by crowning.

The characteristic constitution of the both-end conical roller of the invention is obtained as a result of various tests and studies by the present inventor in order to solve the problems of the prior art.

That is, in the scroll thrust bearing of the invention, in the track pockets of a pair of bearing plates, the both-end conical rollers roll as shown in FIG. 28(b), and relative and smooth scroll swirl of the both bearing plates is assured, while relative rotation of both bearing plates is prevented.

Incidentally, the life of the scroll thrust bearing depends greatly on the durability of the both-end conical rollers used as rolling elements, and the scroll swirl radius of the both-end conical roller is set to coincide with the scroll swirl radius of the swirl unit of the deice to be assembled in, for example, the scroll swirl radius of the scroll constituent portion of the scroll type compressor, and the assembly width is also limited by the structural dimension of the scroll constituent portion.

Accordingly, the shape and dimension of the both-end conical rollers presented for actual use are very small in structure, and it has been difficult to assure the specified durability actually, if possible theoretically.

The inventor tested and studied widely, and succeeded in solving the problems. That is, in the both-end conical rollers composing the scroll thrust bearing, by setting the relation of the scroll swirl radius (R) and the dimension (H) between opposite tracks of the both bearing plates is set in $1<H/R<5$, it has been succeeded in extending substantially not only the life of the both-end conical rollers but also the life of the scroll thrust bearing.

More specifically, since the shape and dimension of the both-end conical rollers are designed to satisfy the above relation, with respect to the preset scroll swirl radius (R) of the both-end conical roller, the section curvature in the contact portion with the track of the both bearing plates on the conical surface of the both-end conical roller is as small as possible in practical range. Therefore, the surface pressure (pressure per unit area) acting on the conical surface of the both-end conical roller is as small as possible, and a sufficient durability is assured practically.

These and other objects and features of the invention will be better appreciated from the reading of the accompanying drawings, detailed description according to the drawings, and novel facts indicated in the claims.

DETAILED DESCRIPTION OF THE PREFERRED EMBODIMENTS

Figure 1A:
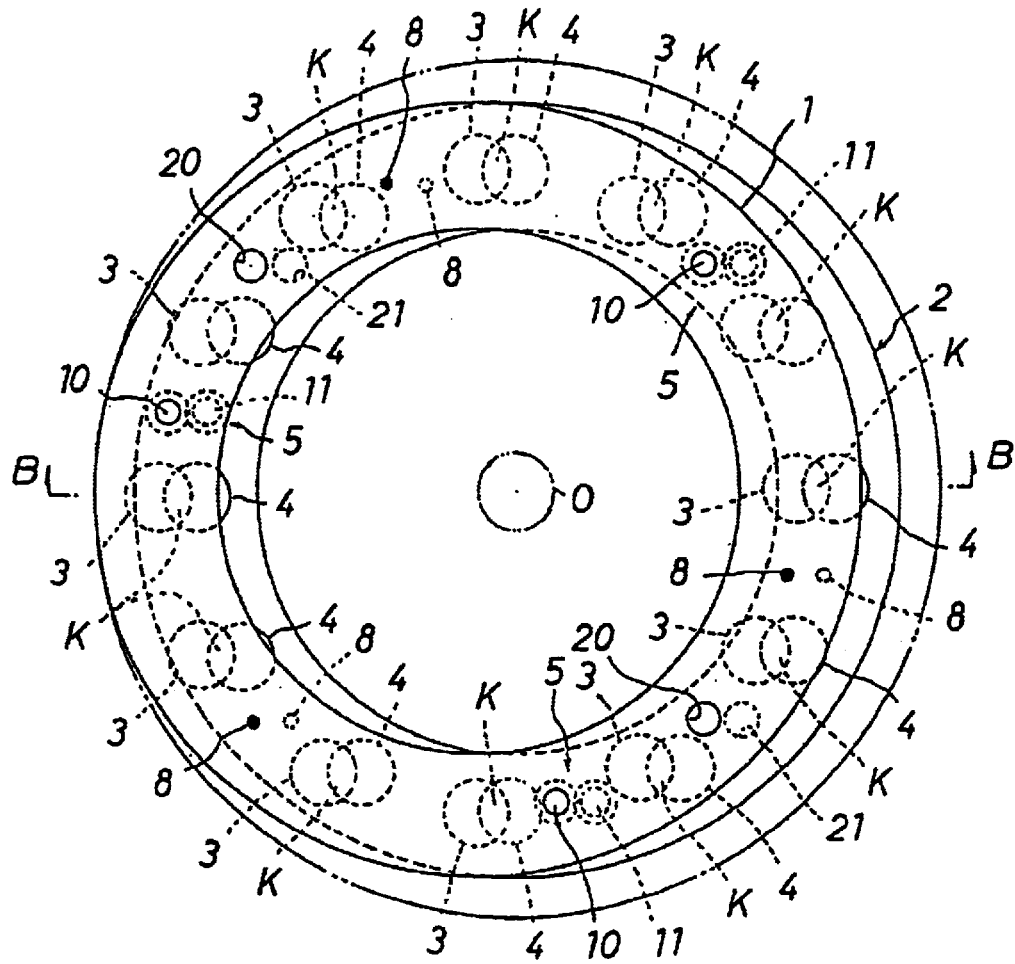
FIG. 1(a) is a plan view showing a scroll thrust bearing in embodiment 1 of the invention.
Figure 1B:
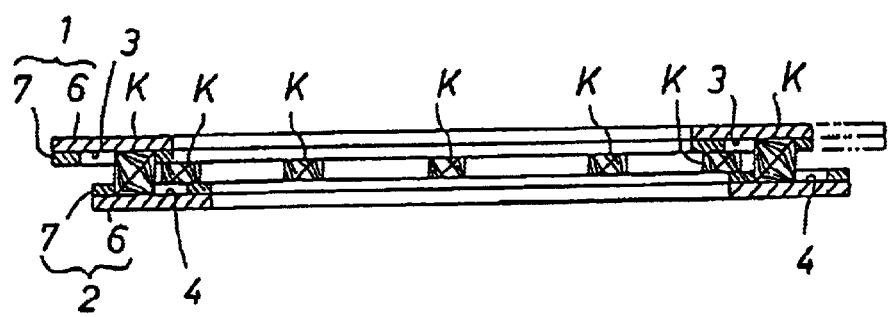
FIG. 1(b) is a sectional view along line B—B in FIG. 1(a) of the scroll thrust bearing.

Referring now to the drawings, preferred embodiments of the invention are described below.

FIG. 1 through FIG. 27 show the scroll thrust bearing of the invention, and same reference numerals indicate identical constituent members and elements throughout the drawings.

Embodiment 1

A roller bearing of the invention is shown in FIG. 1 to FIG. 6. This roller bearing is, specifically, a scroll thrust bearing preferably used as thrust force support structure in a scroll type compressor as shown, for example, in FIG. 28(a).

The scroll thrust bearing comprises a pair of parallel bearing plates 1, 2, and plural (12 in the shown example) track pockets 3, 4 disposed oppositely to them, and a both-end conical roller K is rotatably held each between the pair of confronting track pockets 3, 4. The bearing plates 1, 2 are linked and held so as not to be separated from each other by a linking mechanism 5 as coupling means, so that a scroll thrust bearing of unit structure is formed.

The both-end conical roller K is disposed between the both bearing plates 1 and 2 so as to be free to roll, and receives the thrust load from the bearing plates 1, 2, and is made of bearing steel.

Figure 2A:
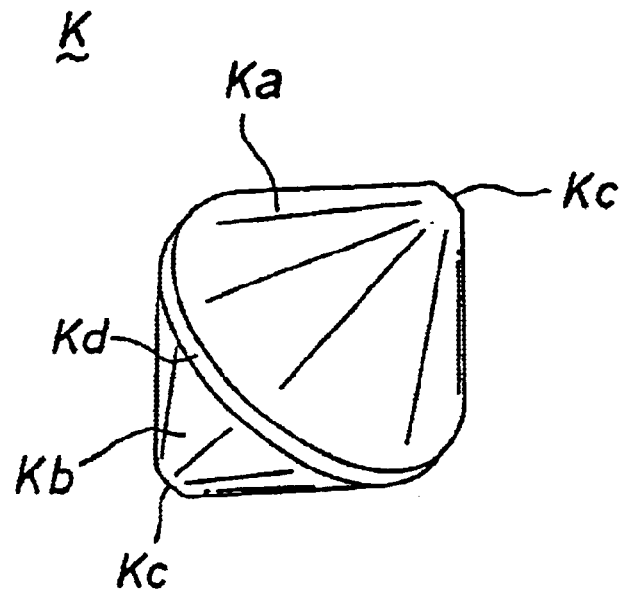
FIG. 2(a) is a perspective view showing a double-end conical roller of the thrust bearing.
Figure 2B:
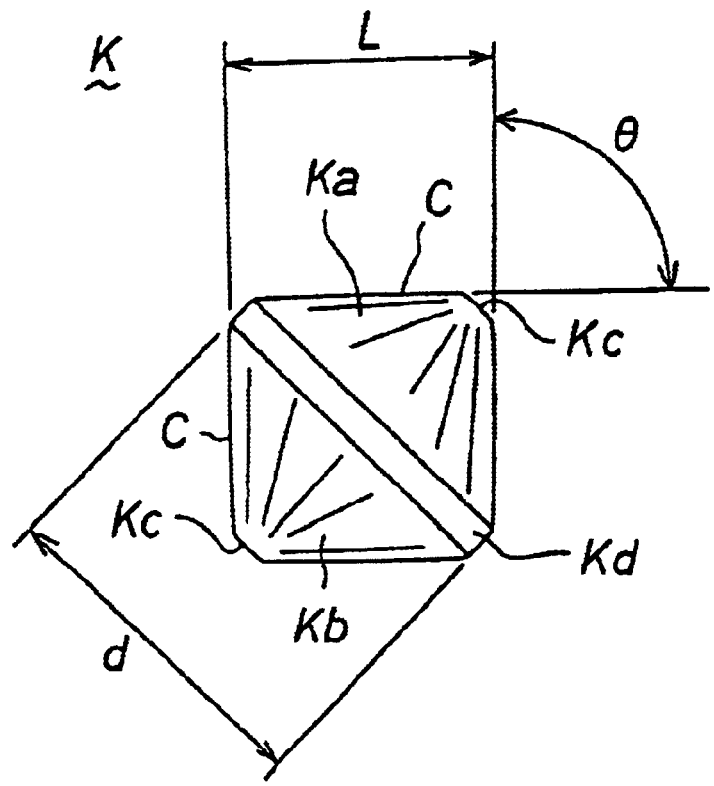
FIG. 2(b) is a front view showing the double-end conical roller of the thrust bearing.

The both-end conical roller K is composed, as shown in FIG. 2, of a pair of conical surfaces Ka, Kb matched coaxially and coupled at the bottom. The corners of the both-end conical roller K, that is, the peak portions Kc, Kc of the both-end conical roller K and the boundary portion Kd of the both conical surfaces Ka, Kb are spherical surfaces.

The both conical surfaces Ka, Kb are rolling surfaces finished by polishing. One conical surface Ka rolls on the track of the track pocket 3 of the bearing plate 1, that is, on the bottom, while the other conical surface Kb rolls on the track of the track pocket 4 of the bearing plate 2, that is, on the bottom.

The specific shape and dimension of the both-end conical roller K are set so that the relation of the scroll swirl radius R and the dimension H between confronting tracks of the both bearing plates 1, 2 may satisfy $1 < H/R < 5$. The reason of setting the value of H/R in this range is as follows.

The lie of the scroll thrust bearing depends very much on the durability of the both-end conical roller K used as the rolling element. On the other hand, the scroll swirl radius R of this both-end conical roller K is set so as to coincide with the scroll swirl radius of the swirl unit of the device to be assembled in, for example, the scroll swirl radius in the scroll type compressor shown in FIG. 28(a), and its assembly width is limited by the structural dimension of the scroll structure. As a result, the size of the both-end conical roller K is very small in structure.

In such circumstance, tests and studies were attempted in various conditions. As a result, the following findings were obtained: at $H/R \leq 1$, the section radius is large in the contact portion with the tracks of the both bearing plates 1, 2 of the both conical surfaces Ka, Kb of the both-end conical roller K, and the surface pressure (pressure per unit area) by the thrust load acting on the conical surface Ka, Kb of the both-end conical roller K is too large. As a result, it is found that sufficient durability for the both-end conical roller K is not obtained at $H/R \leq 1$.

On the other hand, at $5 \leq H/R$, the section radius is small in the contact portion with the tracks of the both bearing plates 1, 2 of the both conical surfaces Ka, Kb of the both-end conical roller K, and a sufficient durability is obtained. To the contrary, however, the dimension H between the confronting tracks of the both bearing plates 1, 2 exceeds the practically allowable range.

By contrast, in a range of $1 < H/R < 5$, all problems are solved, and the section radius in the contact portion with the tracks of the both bearing plates 1, 2 of the both conical surfaces Ka, Kb of the both-end conical roller K can be set as small as possible in a practical range. As a result, the surface pressure acting on the conical surfaces Ka, Kb of the both-end conical roller K is as small as possible, so that a sufficient durability is assured in the both-end conical roller K.

Thus, the specific shape and dimension of the both-end conical roller K are designed to satisfy the condition of $1 < H/R < 5$.

Figure 3:
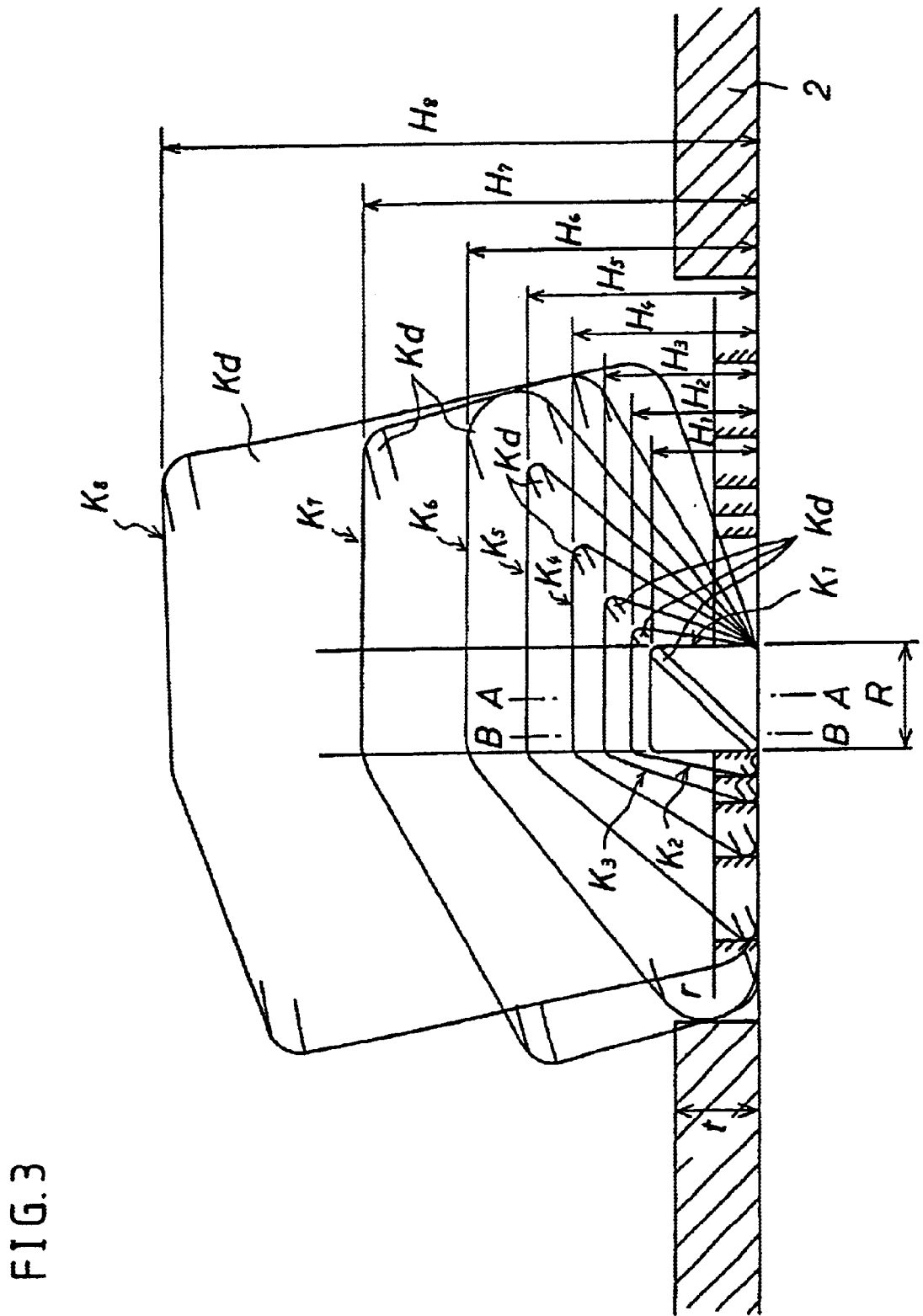
FIG. 3 is an exemplary schematic view showing the shape and size corresponding to various ratios of H/R of the both-end conical roller.
Figure 4A:
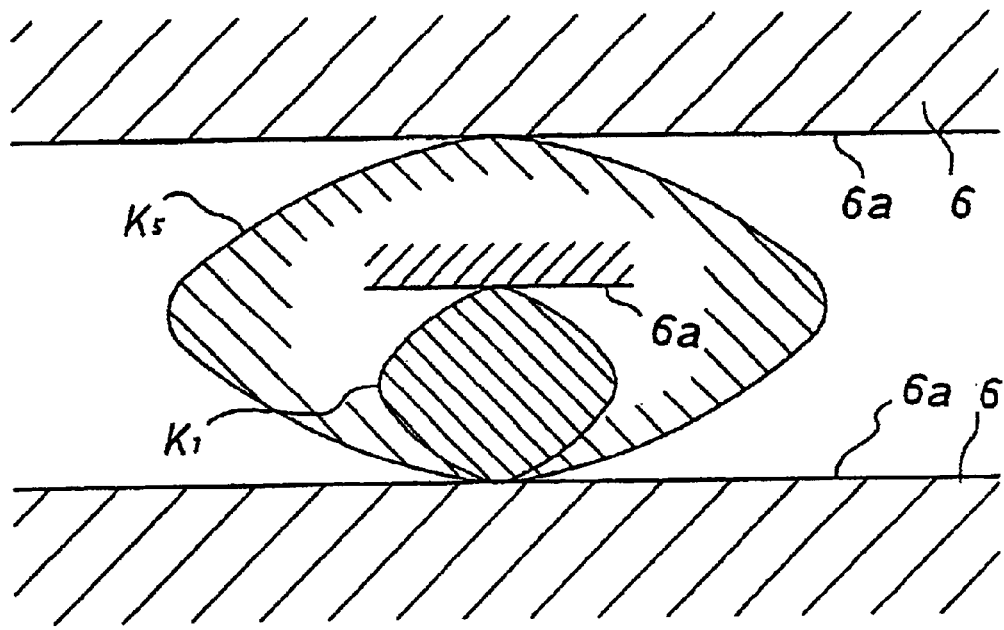
FIG. 4(a) is a sectional view along line A—A in FIG. 3 showing an example of relation of section curvature in the contact portion with the track of bearing plate of both conical surfaces when the value of H/R of the both-end conical roller is close to 1 and when close to 2.
Figure 4B:
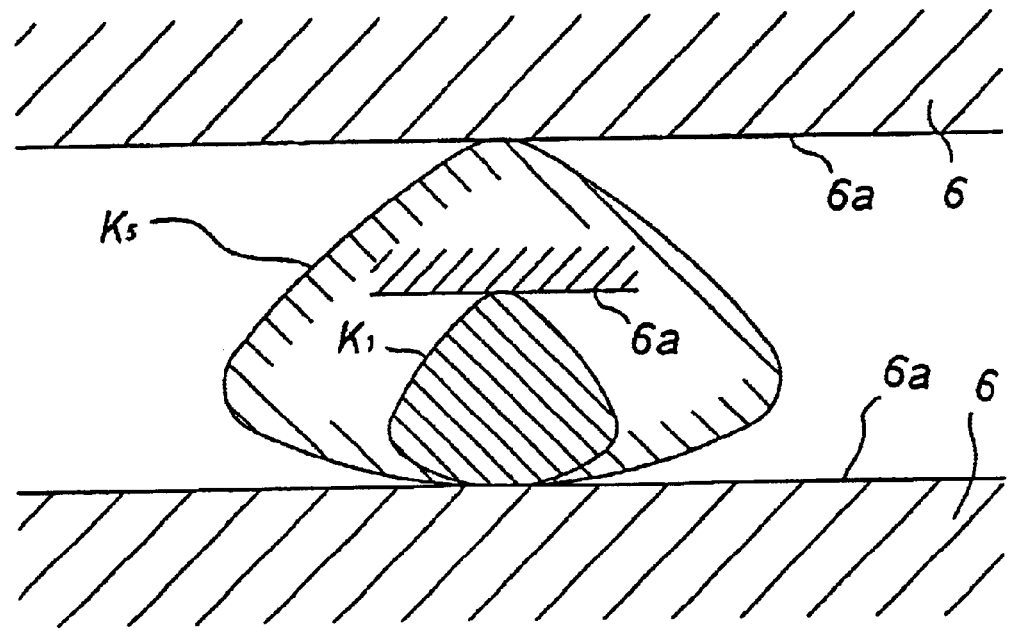
FIG. 4(b) is a sectional view along line B—B in FIG. 3 showing an example of relation of section curvature in the contact portion with the track of bearing plate of both conical surfaces in the both-end conical roller.

FIG. 3 shows an example of shape and dimension of the both-end conical roller K corresponding to various values of H/R. In the diagram, the both-end conical rollers $K_1$ to $K_8$ have the following H/R values: $H_1/R=1.1$, $H_2/R=1.2$, $H_3/R=1.4$, $H_4/R=1.7$, $H_5/R=2.1$, $H_6/R=2.7$, $H_7/R=3.7$, and $H_8/R=4.9$. FIG. 4(a) and FIG. 4(b) show the relation of the section curvature of both conical surfaces Ka, Kb in the contact portions of the both conical surfaces Ka, Kb and the tracks 6a, 6a of the both bearing plates 1, 2, in the both-end conical roller $K_1$ of which H/R value is close to 1 and both-end conical roller $K_5$ of which H/R value is close to 2. Herein, FIG. 4(a) shows section A—A in FIG. 3, and FIG. 4(b) shows section B—B in FIG. 3. As clear from FIG. 4(a) and FIG. 4(b), as the value of H/R becomes larger, the section curvature becomes smaller in the contact portion with the tracks of the both bearing plates 1, 2 of the both conical surfaces Ka, Kb, and it is known that the surface pressure due to thrust load acting on the conical surfaces Ka, Kb of the both-end conical roller K becomes smaller Referring to FIG. 3, the coupling bottom of the both conical surfaces Ka, Kb of the both-end conical roller K, that is, the boundary portion Kd of the both conical surfaces Ka, Kb has a junction surface including the arc section continuous to the both conical surfaces Ka, Kb. This coupling bottom Kd has the shape and size in consideration of the relation with the inside diameter of the track pockets 3, 4 of the bearing plates 1, 2 mentioned later. In particular, when the value of H/R is large, the contact length in the generator direction of both conical surfaces Ka, Kb corresponding to the tracks of the track pockets 3, 4 of the both bearing plates 1, 2 is set to be as small as possible. By thus setting, the maximum diameter d (see FIG. 2) of the both-end conical roller K can be set as small as possible while maintaining the specified performance and durability of the both-end conical roller K. In this regard, the coupling bottom Kd of the both-end conical roller K may be provided with, if necessary, a clearance (not shown) for avoiding interference with the inner side of the track pockets 3, 4.

Referring also to the both-end conical roller $K_5$ shown in FIG. 3, the inner side height t of the track pockets 3, 4 of the both bearing plates 1, 2 is set, preferably in design, larger than the radius of curvature r of the arc section of the junction surface Kd of the both-end conical roller $K_5$, so that wear due to contact of the both is kept to a minimum limit.

In the embodiment, the H/R is set nearly at a same value larger than 1 (H/R≈1), and the apex angle formed by two peaks (geometrical peaks) of the both-end conical roller K, that is, the conical angle θ is about 90°, and hence the intersection angle of the both conical surfaces Ka, Kb is set to be about 90°. The junction plane Kd of the coupling bottom of the both conical surfaces Ka, Kb of the both-end conical roller K is a spherical surface composed of a single arc only as mentioned above.

Further, the generator length of the conical surfaces Ka, Kb, that is, the length L of the conical surfaces Ka, Kb is set to be nearly equal to the scroll radius in the scroll compressor to be assembled. The entire surface of the conical surfaces Ka, Kb is processed by crowning C.

The peripheral contour shape of the crowning C is an arc shape having a single radius of curvature along the overall length of the generator of the conical surfaces Ka, Kb. The radius of curvature of the arc shape is preferably set at 100 times or less of the generator length L of the conical surfaces Ka, Kb. By this crowning C, edge load does not occur at both ends of the sectional linear part of the conical surfaces Ka, Kb, and the contact stress at the apex side can be suppressed to a low value within an allowable range. In the state of the both-end conical roller K being assembled in the scroll thrust bearing, the load applied to the conical surfaces Ka, Kb of the both-end conical roller K is designed to be biased to the larger diameter side of the conical surfaces Ka, Kb, so that deviation of the peak of the maximum contact stress to the apex side can be prevented effectively.

The bearing plates 1, 2 are identical in structure. For example, the bearing plate 1 of the upper side is formed by laminating and fixing a track plate 6 and a holding plate 7 integrally.

Figure 5A:
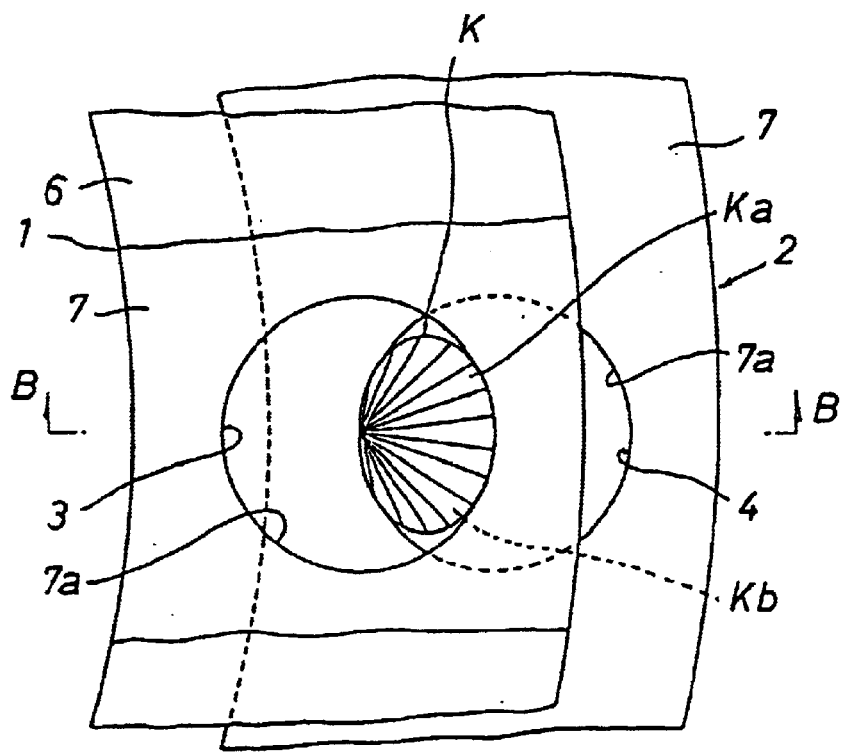
FIG. 5(a) is a partially cut-away magnified plan view of a holding structure of both-end conical roller as an essential part of the thrust bearing.
Figure 5B:
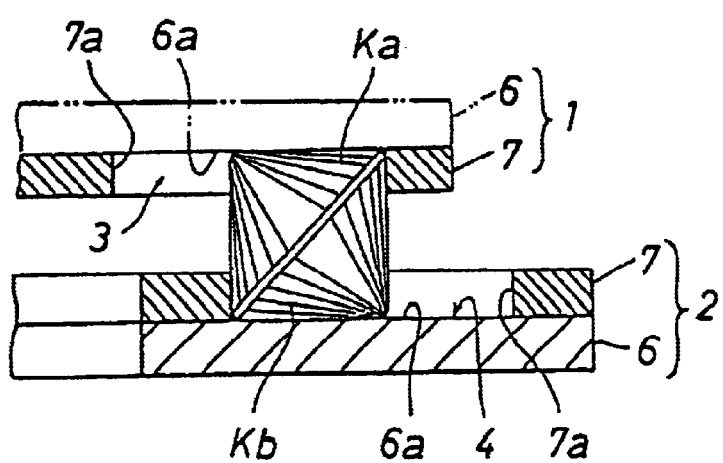
FIG. 5(b) is a section along line B—B in FIG. 5(a) showing the holding structure of the both-end conical roller.

The track plate 6 is specifically an annular flat plate, and its inner side 6a (FIG. 4 and FIG. 5(b)) is a flat track forming surface. The holder plate 7 is specifically an annular flat plate having the same inside and outside diameter as the track plate 6, and in the width central positions in its diameter direction, as shown in the drawing, pocket forming holes 7a, 7a, . . . are opened in a plurality (12 positions in the shown example) at equal intervals in the circumferential direction.

The track plate 6 and holding plate 7 are mutually integrated and fixed integrally by rivets 8, and the track forming surface 6a of the track plate 6 and the pocket forming holes 7a, 7a, . . . of the holding plate 7 are forming the track pocket 3 (4).

Figure 28A:
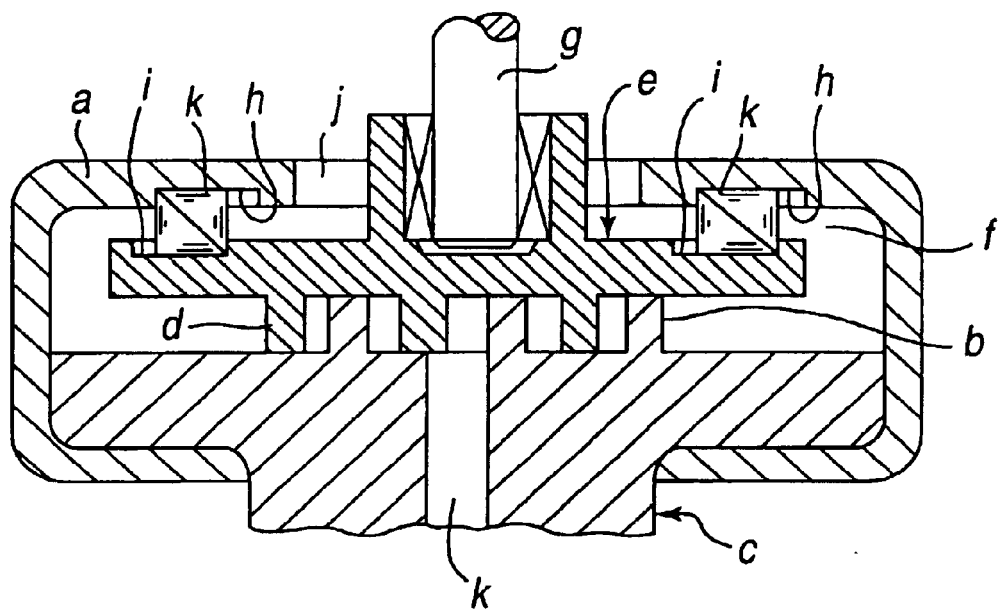
FIG. 28(a) is a sectional view showing a thrust force support structure having a conventional body-end conical roller in a scroll type compressor to which the roller bearing is applied.
Figure 28B:
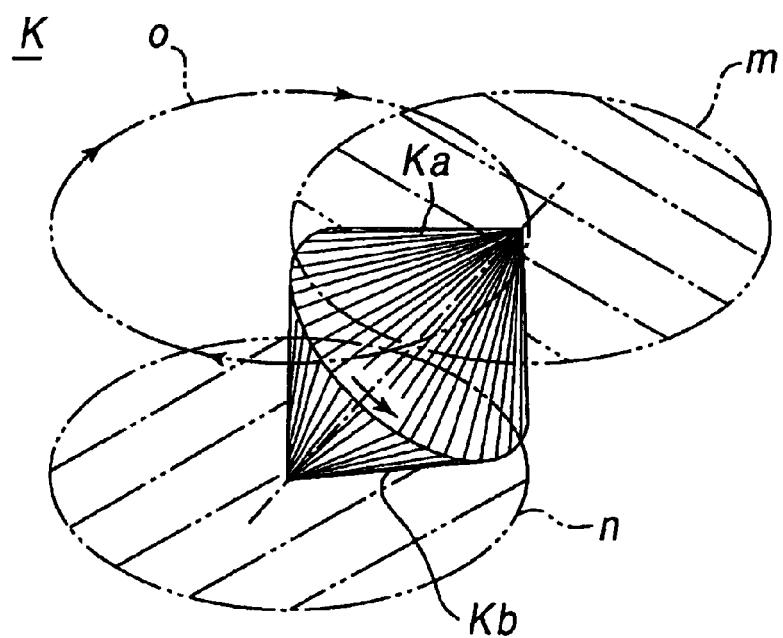
FIG. 28(b) is a perspective view schematically showing the swirl rolling state of the both-end conical roller.

The inner sides of the track pockets 3, 4, that is, the inner sides of the pocket forming holes 7a are of the same diameter as the swirl hole of the both-end conical roller K (see outer circumferential circles of surfaces m, n of FIG. 28(b)). The inner sides of the pair of confronting track pockets 3, 4 of the both bearing plates 1, 2 are disposed in a mutually eccentric state, in a plan view, by the portion of the swirl circle radius of the both-end conical roller K as shown in FIG. 1(a) and FIG. 5(a). Thus, the both-end conical roller K is guided and held freely in the nearly elliptical holding holes formed in overlap with the inner sides of the track pockets 3, 4.

Figure 6:
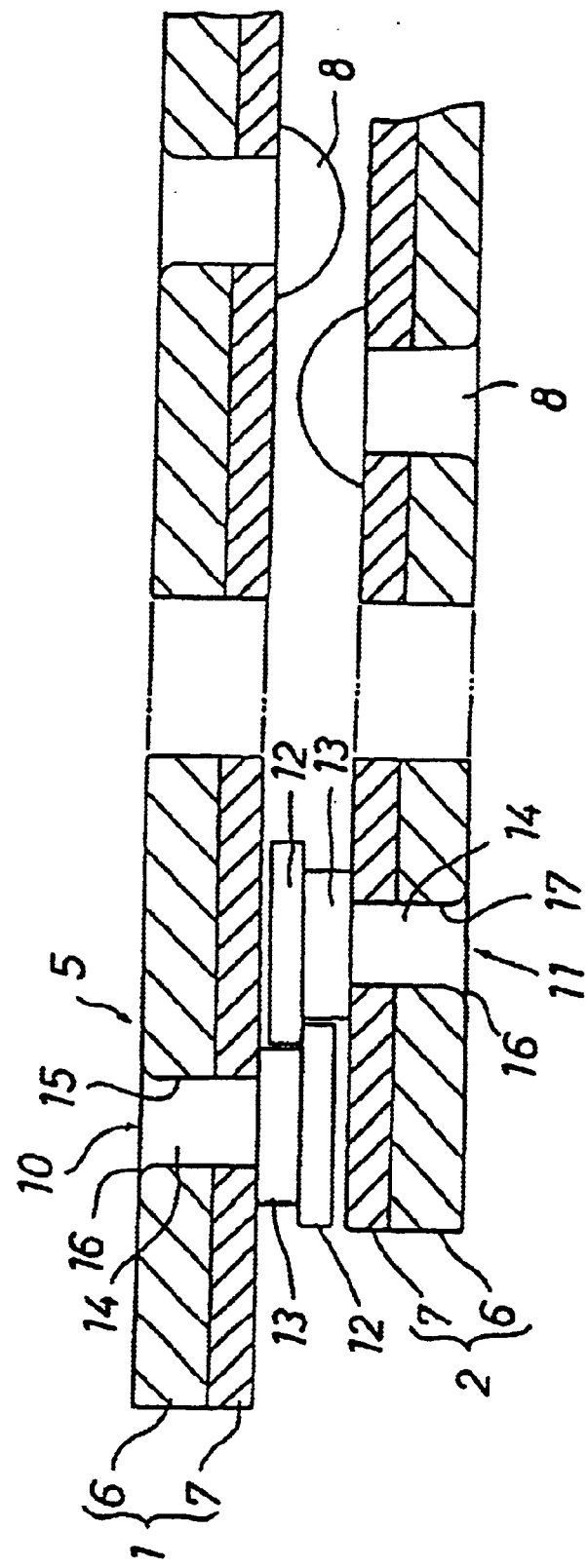
FIG. 6 is a magnified sectional view of linkage mechanism which is other essential part of the thrust bearing.

The linking mechanism 5 is to link and hold the both bearing plates 1, 2 in a relative rotatable state with the both-end conical rollers K, K, . . . interposed between the pair of bearing plates 1, 2. This linking mechanism 5 is specifically, as shown in FIG. 6, composed of a pair of linking pins 10, 11 fixed respectively to the both bearing plates 1, 2.

These linking pins 10, 11 are identical in structure. For example, the one linking pin 10 is made of rigid material such as stainless steel, and an engaging flange 12, a swirl shaft 13, and a mounting shaft 14 are formed coaxially.

The engaging flange 12 is a large-diameter disk fitted to the leading end of the linking pin 10, and its outer cylindrical surface is an engaging plane. The swirl shaft 13 is disposed adjacently to the axial base end side of the engaging flange 12. The swirl shaft 13 has an outer cylindrical surface of a smaller diameter than the engaging flange 12, and this outer surface is an engaging plane. The mounting shaft 14 is provided in the base end portion of the linking pin 11, and it has the outside diameter and length enough to penetrate through a penetration hole 15 of the bearing plate 1.

The mounting shaft 14 penetrates into the penetration hole 15 from the inside, and the boundary step of the mounting shaft 14 and swirl shaft 13 is stopped at the inner side of the bearing plate 1, and the outer end of the mounting shaft 14 is crimped 16 from the outside of the bearing plate 1, so that the linking pin 10 is fixed at the inside of the bearing plate 1 in an upright state.

The other linking pin 11 is composed same as the linking pin 10. The mounting shaft 14 of the linking pin 11 penetrates into a penetration hole 17 of the bearing plate 2 from the inside, and its outer end is crimped 16 from the outside of the bearing plate 2, and is fixed at the inside of the bearing plate 2 in an upright state.

These linking pins 10, 11 are also designed to laminate and fix the track plate 6 and holding plate integrally together with the rivet 8, and are composed to be suited to automatic assembling.

The relative configuration of the linking pins 10, 11, that is, the outside diameter of the engaging flange 12 and swirl shaft 13 and the layout of the penetration holes 15, 17 for penetrating and holding the mounting shaft 14 are set to satisfy the following conditions.

That is, as shown in FIG. 6, the engaging flanges 12, 12 of the both linking pins 10, 11 are engaged with each other in the axial direction of the linking pins 10, 11, and the outer engaging planes of these engaging flanges 12, 12 are fixed so as to slide relatively each other rotatably in the same tracking as the swirl circle of the both-end conical bearing K on the outer engaging plane of the swirl shaft 13 of the opposite side linking pin 10 or 11. Therefore, the both bearing plates 1, 2 are prevented from separating into the axial direction by the linking pins 10, 11, and by rolling of the both-end conical roller K, they are held in a relatively rotatable state in the same tracking as the swirl circle of the both-end conical roller K. A certain slight gap is formed between the engaging planes of the both linking pins 10, 11, and this slight gap dimension is determined appropriately depending on the shape and size of the both-end conical roller K.

In thus constituted bearing, the both-end conical roller K roll on the track or the bottom of the track pockets 3, 4 while the both conical surfaces Ka, Kb are guided on the inside surfaces of the track pockets 3, 4 of the bearing plates 1, 2, in the track pockets 3, 4 of the pair of bearing plates 1, 2. Thus, relative and smooth swirl of the both bearing plates 1, 2 is guaranteed (see swirl path o in FIG. 1(a)), and the relative rotation of the both bearing plates 1, 2 is prevented.

In other words, the both-end conical roller K rolls on the track, and swirls about the apex of the both conical surfaces Ka, Kb as shown in FIG. 28(b). At this time, the track pockets 3, 4 are positioned in a phase deviated by the length of the generator of the conical surfaces Ka, Kb of the both-end conical roller K, and therefore the both-end conical roller K rolls as being guided in a state restrained or defined by the inside surface of the track pockets 3, 4, so that the correct position of the both-end conical roller K is maintained. As a result, the one bearing plate 1, not rotating relatively on the other bearing plate 2, swirls as being deviated by the length of the generator of the conical surfaces Ka, Kb of the both-end conical roller K (see arrow o in FIG. 1(a)).

Moreover, the both-end conical roller K rolls on the track, without slipping at all, while keeping a correct linear contact state, between the eccentrically swirling bearing plates 1, 2. Therefore, the both-end conical roller K realizes an ideal and complete rolling contact state as rolling bearing, and is extremely improved in rigidity and life as compared with the roller bearing or thrust force support structure using steel balls or other spheres.

In the both-end conical roller K, the relation H/R of the scroll swirl radius and the dimension H between opposing track surfaces of the both bearing plats 1, 2 is set at a nearly same value larger than 1 as mentioned above (H/R≈1). Hence, the section curvature of the conical surfaces Ka, Kb of the both-end conical roller K in the contact portion with the tracks of the both bearing plates 1, 2 is as small as possible within a practical range, in relation to the preset scroll swirl radius R of the both-end conical roller K. As a result, the surface pressure (pressure per unit area) acting on the conical surfaces Ka, Kb of the both-end conical roller K is kept as small as possible, and a sufficient durability is assured.

The both bearing plates 1, 2 are in a unit structure linked and held in a relatively rotatable state by the linking pins 10, 11. Therefore, the both-end conical rollers K, K, . . . held in the track pockets 3 and 4, 3 and 4, . . . of the both bearing plates 1, 2 are stably maintained in the held state all the time without disturbing the configuration in any environment such as vibration or the like. Thus, the rolling motion of the bearing plates 1, 2 is smooth, and it is easy to carry and handle as a single part of bearing or assemble into the device swirl unit.

Besides, for the ease of assembling into the device swirl unit, the bearing plates 1, 2 have the positioning parts to be engaged with the fixed side or swirl side positioning part of the device swirl unit to be assembled in.

In the illustrated embodiment, as shown in FIG. 1(a), positioning holes 20, 21 are provided as positioning parts of the bearing plates 1, 2. These positioning holes 20, 21 are, although not shown, engaged with, for example, the positioning pins provided in the scroll swirl unit of the scroll type compressor. For this purpose, the positioning holes 20, 21 are provided in a pair at opposite positions on one diameter line of the bearing plates 1, 2. The configuration of the positioning holes 20, 21 is determined according to the positioning pins in the device swirl unit to be assembled in.

That is, in the engaged state of the positioning holes 20, 21 with the positioning pins of the device swirl unit, the configuration of the roller bearing is maintained, so that relative and smooth rolling motion of the bearing plates 1, 2 is guaranteed.

In the assembled state of the roller bearing in the device swirl unit, the swirl route of the device swirl unit and the swirl route of the roller bearing coincide with each other completely. Accordingly, the both-end conical rollers K, K, . . . of the roller bearing always roll smoothly and stably depending on the swirl motion of the device swirl unit, and therefore abnormal load does not occur due to mis-matching of both swirl routes. As a result, the swirl side bearing plate 2 swirls smoothly by following up the swirl motion of the device swirl unit without causing any deviation from the fixed side bearing plate 1. The linking pins 10, 11 do not interfere the swirl motion.

Embodiment 2

This embodiment is shown in FIG. 7 to FIG. 11. The scroll thrust bearing of the embodiment comprises a plurality of both-end conical rollers K, K, . . . held by a holder 23 rotatably between a pair of parallel bearing plates 1, 2, and a rotation preventive mechanism 24 preventing relative rotation of the both bearing plates 1, 2.

The upper and lower bearing plates 1, 2 are mutually identical in structure. The bearing plates 1, 2 are specifically composed of flat annular races made of bearing steel, and the mutually confronting inside surfaces 1a, 2a of the bearing plates 1, 2 are flat track surfaces for rolling of the both-end conical rollers K, K, . . . .

The specific structure of the both-end conical roller K is same as in embodiment 1 (see FIG. 2). The both-end conical roller K is rotatably held by the holder 23 between the both bearing plates 1, 2, and one conical surface Ka rolls on the track 1a of the bearing plate 1, and the other conical surface Kb rolls on the track 2a of the bearing plate 2.

The holder 23 positions and holds the both-end conical rollers K, K, . . . rotatably in a specific configuration. The holder 23 is specifically formed as a flat annular plate corresponding to the bearing plates 1, 2.

The holding plate 23 is a one-piece body made of synthetic resin by injection molding. In the holding plate 23, holding pockets 30 for holding the both-end conical rollers K are disposed at plural positions at specific intervals in the circumferential direction. Specifically, the holding pockets 30 are disposed at plural positions in two rows at equal intervals in the circumferential direction of the holding plate 23 (in this example, 24 positions in one row: total 48 positions) Thus, the plurality of (48) both-end conical rollers K, K, . . . are arranged in two rows in a dual row structure.

Figure 10A:
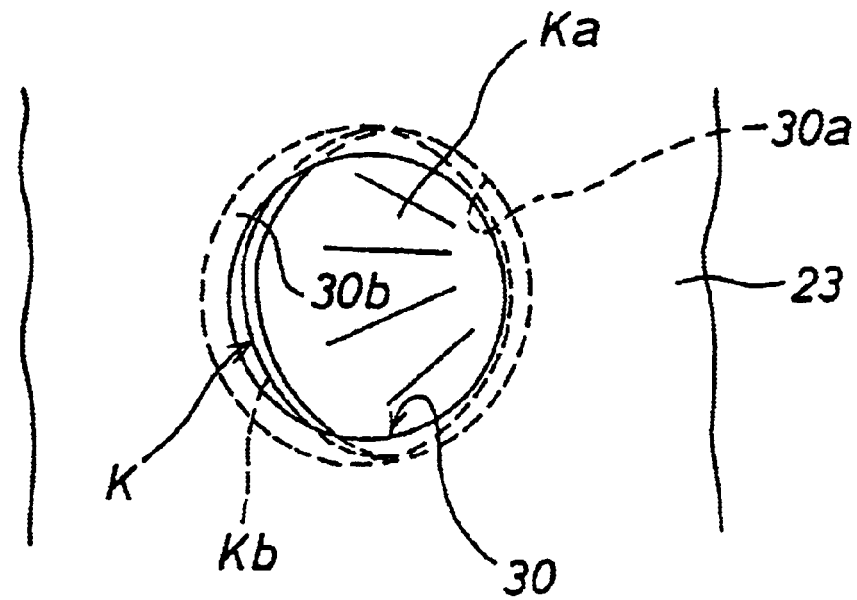
FIG. 10(a) is a magnified plan view showing a holding unit structure of both-end conical roller of the thrust bearing.
Figure 10B:
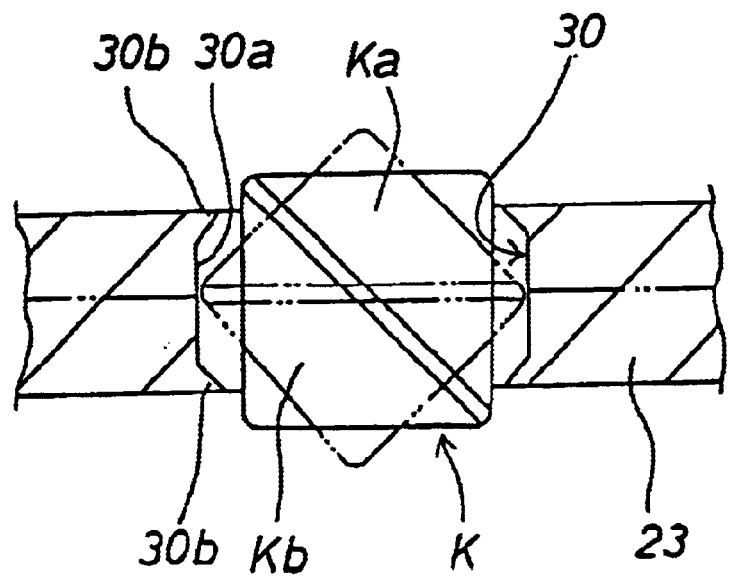
FIG. 10(b) is a magnified plan view showing a holding unit structure of both-end conical roller of the thrust bearing.

The specific structure of each holding pocket 30 is as shown in FIG. 10, in which a pocket hole penetrates from upper to lower side of the holding plate 23. The pocket hole 30 has an inner circumferential surface 30a having a uniform diameter slightly larger than the maximum diameter d of the both-end conical roller K (see FIG. 2). The opening of the pocket hole 30 is an annular inward flange 30b having an inside diameter slightly smaller than the maximum diameter of the both-end conical rollers K, K, . . . . Accordingly, the both-end conical roller K is rotatably held in the pocket hole 30 so as not to drop out, and projects oppositely to the upper and lower side of the holding plate 23 (see FIG. 10(b)).

The number of both-end conical rollers K is determined in relation to the shape and size of the both-end conical roller K depending on the thrust load to be applied.

Figure 11A:
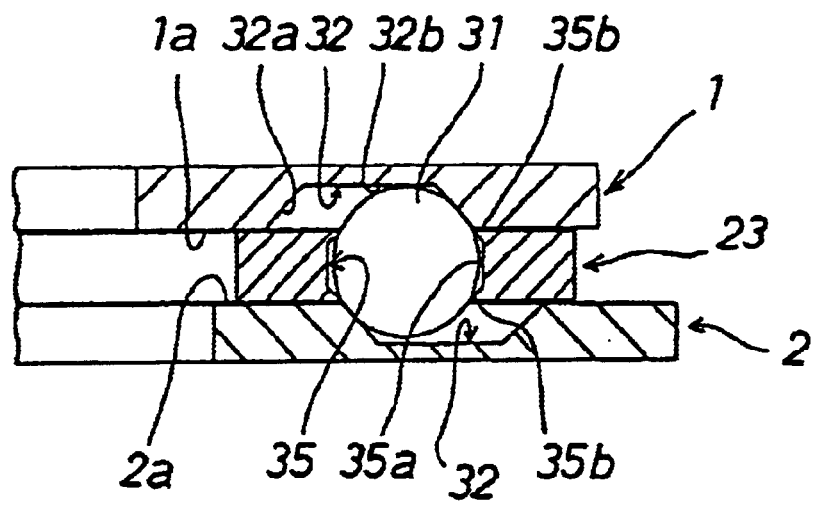
FIG. 11(a) is a sectional view showing a rotation preventive mechanism of the thrust bearing.
Figure 11B:
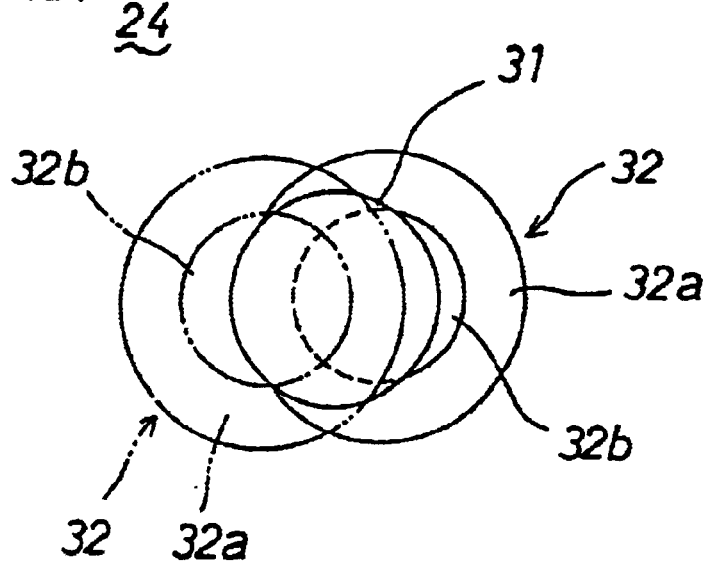
FIG. 11(b) is a plan view showing the rotation preventive mechanism of the thrust bearing by a partially virtual line.

The rotation preventive mechanism 24 prevents relative rotation of the both bearing plates 1, 2. As shown in FIG. 11, the rotation preventive mechanism 24 is composed of a rolling ball 31 held on the holding plate 23, and a pair of ball tracks 32, 32 provided in the both bearing plates 1, 2.

The rolling ball 31 supports the moment load from the both bearing plates 1, 2. The rolling ball 31 is a steel ball of true spherical shape made of same bearing steel as the both-end conical roller K, and is rotatably held in a ball pocket 35 of the holding plate 23.

In the illustrated embodiment, four ball pockets 35 are provided at equal intervals in the circumferential direction of the holding plate 23. The structure of the ball pocket 35 is shown in FIG. 11, and same as the roller holding pocket 30, it is a pocket hole penetrating from upper to lower side of the holding plate 23. The pocket hole 35 has an inner circumferential surface 35a having a uniform diameter slightly larger than the outside diameter of the rolling ball 31. The opening of the pocket hole 35 is an annular inward flange 35b having an inside diameter slightly smaller than the outside diameter of the rolling ball 31. Thus, the rolling ball 31 is rotatably held in the pocket hole 35 so as not to drop out, and projects oppositely to the upper and lower side of the holding plate 23.

The pair of ball tracks 32, 32 are formed as track pockets disposed oppositely to the mutually confronting surfaces of the both bearing plates 1, 2. The pair of track pockets 32, 32 are rotatably engaged with the rolling balls 31 held on the holding plate 23.

The structure of the track pockets 32 is a flat circular shape as shown in FIG. 11, and an annular track 32a to be engaged with the rolling ball 31 is formed in the inside. The annular track 32a is formed as a taper surface spreading widely toward the opening. The bottom 32b of the track pocket 32 is formed in a flat plane, and its depth is set in a size so as not to contact with the rolling ball 31 when assembling the bearing.

The opposite pair of track pockets 32, 32 are combined with the both bearing plates 1, 2 so as to be positioned in an eccentric state by the portion of the radius (=generator length of conical surfaces Ka, Kb) of the swirl circle of the both-end conical roller K (see the outer contour circle of planes m, n in FIG. 28(b)).

Thus composed set of rolling balls 31 and ball tracks 32, 32 is disposed at plural positions (4 positions in this example) at equal intervals in the circumferential direction, thereby constructing the rotation preventive mechanism 24.

The configuration of the rolling balls 31 and ball tracks 32, 32 is determined so as not to interfere mutually with the rolling of the both-end conical rollers K, K, . . . , and to exhibit a well-balanced rotation preventive function. The number of sets of the rolling balls 31 and ball tracks 32, 32 is set depending on the moment load to be applied.

In the illustrated embodiment, for example, four sets of the rolling balls 31 and ball tracks 32, 32 are disposed at equal intervals, but when the moment load to be applied is smaller, three sets may be enough. To the contrary, in the case of a larger load, five or six sets of the rolling balls 31 and ball tracks 32, 32 are disposed at equal intervals. The configuration is not limited to the shown layout as far as the balance is maintained. For effective expression of the relative rotation preventive function of the both bearing plates 1, 2, it is preferred to have at least three sets of the rolling balls 31 and ball tracks 32, 32.

The scroll thrust bearing having such construction is assembled as a thrust force support structure in a scroll type compressor as shown in FIG. 28(a). In this case, for example, the upper side bearing plate 1 is integrally mounted and fixed on the housing (a) as the fixed side bearing plate, and the lower side bearing plate 2 is integrally mounted and fixed on the swirl scroll member (e) as the swirl side bearing plate.

In this regard, for the ease of assembling into the device swirl unit and prevention of deviation of mounting position, the bearing plates 1, 2 have the positioning parts to be engaged with the fixed side or swirl side positioning part of the device swirl unit to be assembled in.

Figure 7A:
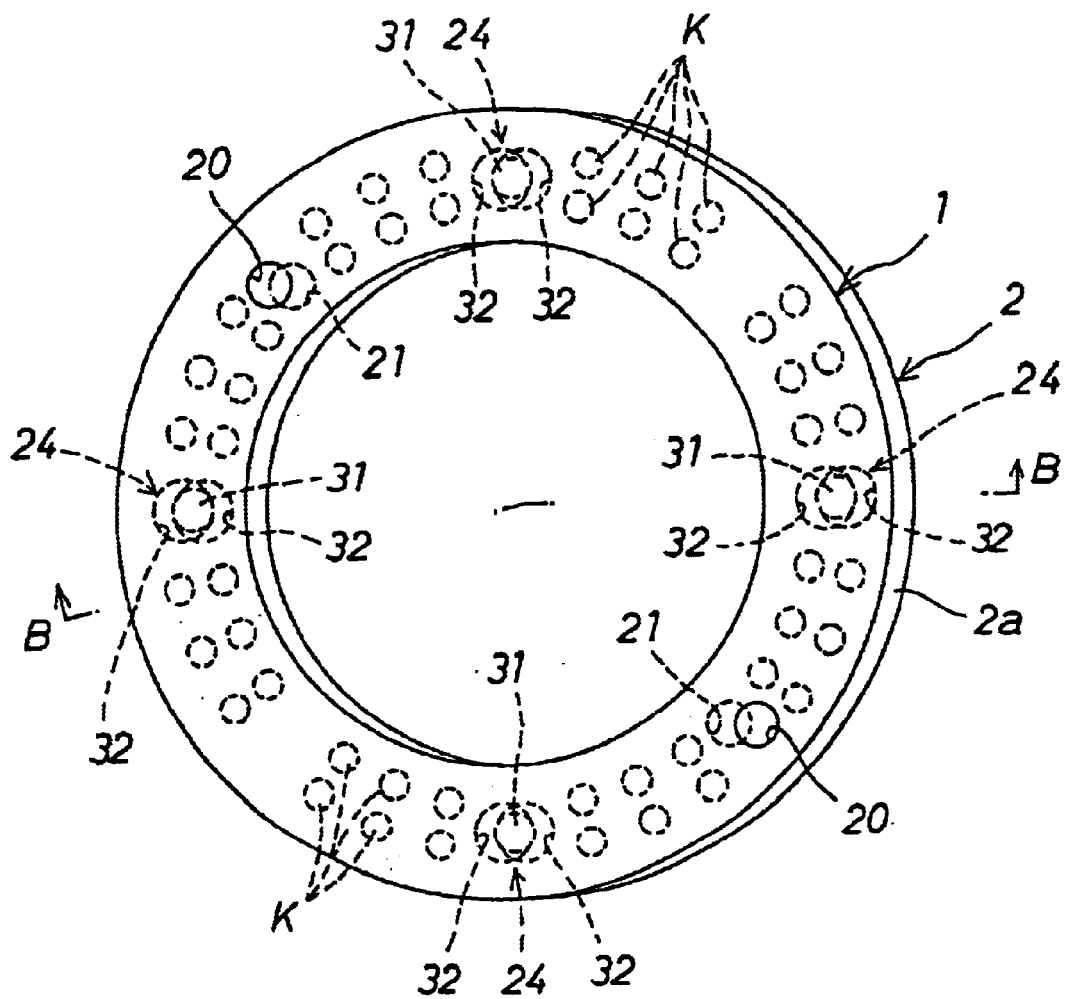
FIG. 7(a) is a plan view showing a scroll thrust bearing in embodiment 2 of the invention.
Figure 7B:
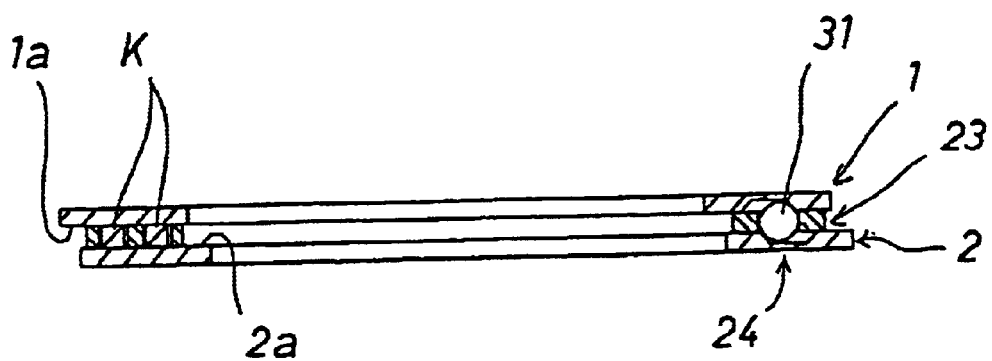
FIG. 7(b) is a sectional view along line B—B in FIG. 7(a) showing the scroll thrust bearing.
Figure 8:
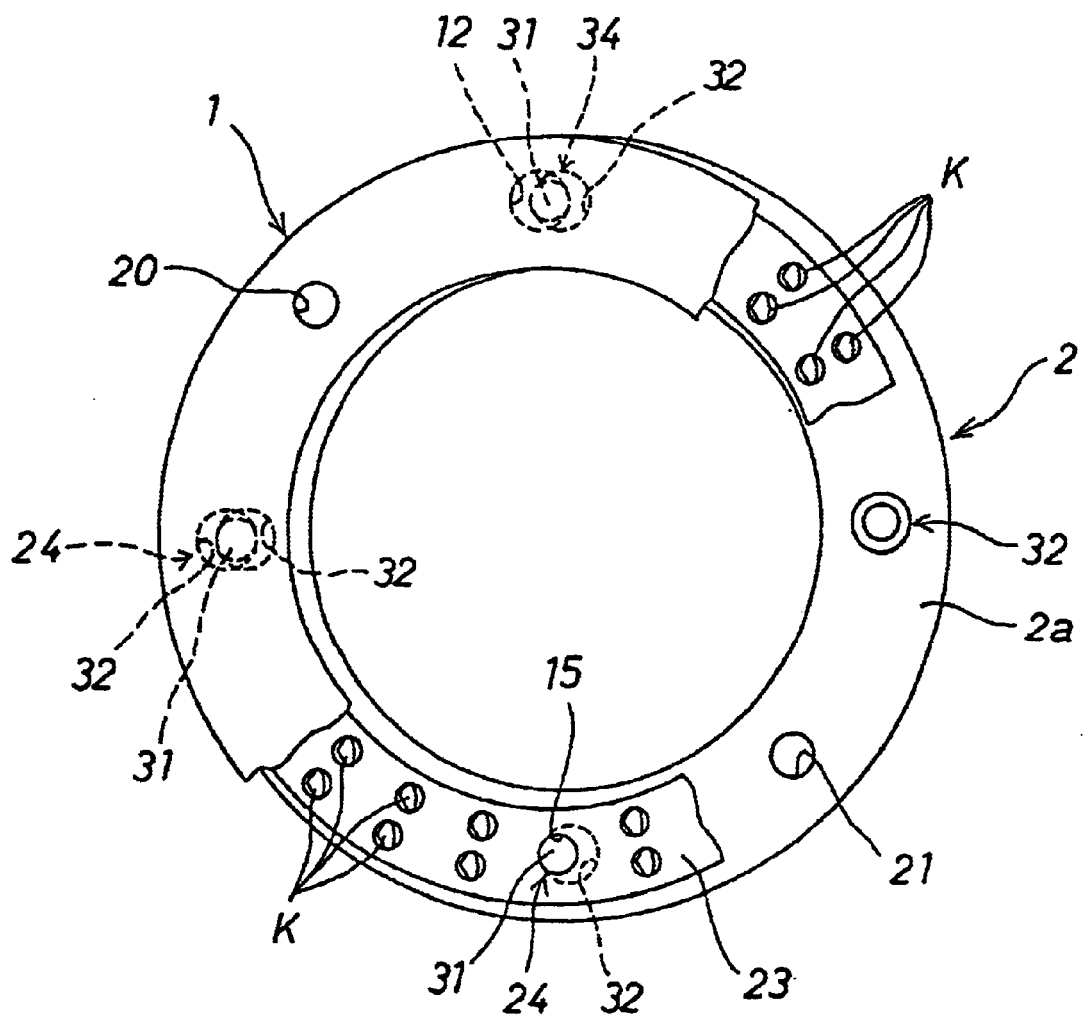
FIG. 8 is a partially cut-away plan view of the thrust bearing.
Figure 9:
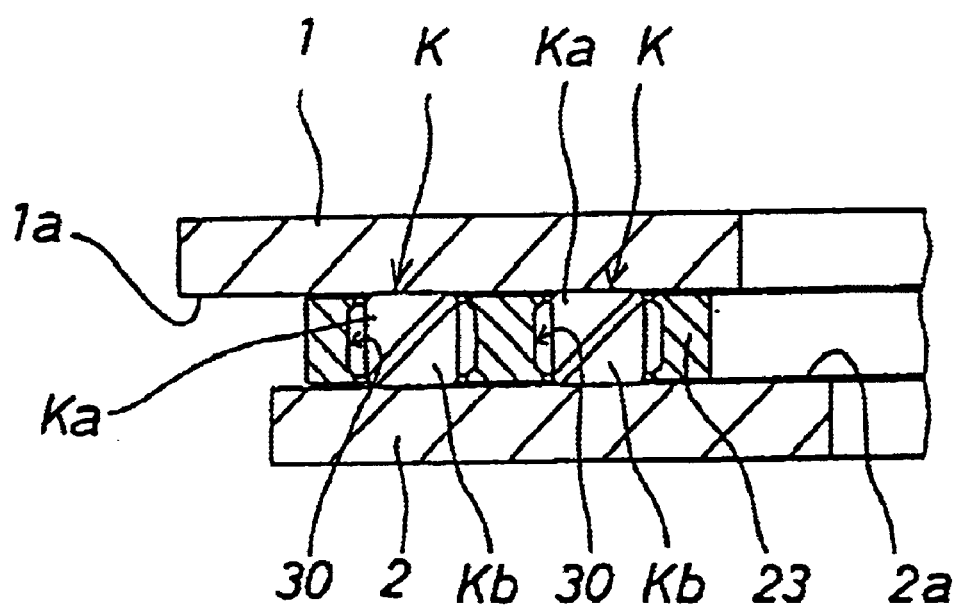
FIG. 9 is a magnified sectional view of a structural relation of both-end conical roller, both bearing plates and holding plate of the thrust bearing.

In the illustrated embodiment, as shown in FIG. 7(a), positioning holes 20, 21 are provided as positioning parts of the bearing plates 1, 2. These positioning holes 20, 21 are, although not shown, engaged with, for example, the positioning pins provided in the housing (a) and swirl scroll member (e). For this purpose, the positioning holes 20, 21 are provided in a pair at opposite positions on one diameter line of the bearing plates 1, 2, and its configuration is determined according to the positioning pins in the device swirl unit to be assembled in.

Thus, in the engaged state of the positioning holes 20, 21 with the positioning pins of the device swirl unit, the configuration of the thrust bearing is determined.

In the scroll thrust bearing assembled integrally in the scroll type compressor, when the swirl scroll member (e) swirls through the crankpin (g) by a rotation drive source, without rotating by the action of the rotation preventive mechanism 24 (31, 32, 32), the swirl scroll member (e) swirls or revolves on the fixed scroll member (c), and a specified compression process is executed.

By this compression process, the thrust load generated in the bearing plate 2 is supported by conical rollers K, K, . . . disposed between the both bearing plates 1, 2, and these conical rollers K, K, . . . roll in linear contact state on the tracks 1a, 2a of the both bearing plates 1, 2 by their conical surfaces Ka, Kb.

In the mechanism of rolling motion of the both-end conical rollers K, K, . . . , when the compressor is stopped, the both-end conical rollers K, K, . . . are not always aligned correctly corresponding to the swirl motion of the compressor, but as the operation of the compressor starts, they are aligned naturally.

That is, when the compressor is stopped, the pressure is low in the pressure chamber formed between the both scroll members (c, e), and there is almost no force of pushing the bearing plates 1, 2 in the thrust direction (thrust load). Accordingly, the both-end conical rollers K remain in a free direction in a state held by the roller pocket holes 30 of the holding plate 23. When the compressor begins to operate, the pressure in the compression chamber increases gradually, and the thrust load applied to the bearing plates 1, 2 builds up. In consequence, the both-end conical rollers K pressurized in the vertical direction by the bearing plates 1, 2 are tightly engaged with the tracks 1a, 2a, and gradually follow up the scroll motion of the bearing plates 1, 2 and are finally aligned in the direction corresponding to the swirl motion of the compressor, so that smooth scroll motion is achieved.

When the direction of all both-end conical rollers K, K, . . . is aligned and the thrust load is further increased, the motion of the both-end conical rollers K, K, . . . is finally rolling motion only. As a result, along the rotation preventing action by the rotation preventive mechanism 24, it contributes to relative rotation of the both scroll members (c, e), that is, prevention of rotation of the swirl scroll (e).

Thus, in this thrust bearing, while preventing relative rotation of the pair of bearing plates 1, 2 by the rotation preventive mechanism 24, relative and smooth swirl of the both bearing plates 1, 2 is assured by the rolling motion of the both-end conical rollers K, K, . . . on the bearing plates 1, 2.

The both-end conical rollers K, K, . . . are positioned and held rotatably in a specified configuration by the holding plate 23, and are stably maintained in the held state all the time without disturbing the configuration in any environment such as vibration or the like. Thus, the rolling motion is smooth, and it is easy to carry and handle as a single part of bearing or assemble into the device swirl unit.

Moreover, since the rotation preventive mechanism 24 is provided independently of the both-end conical rollers K, K, . . . , the both-end conical rollers K, K, . . . support only the thrust load from the both bearing plates 1, 2. Therefore, the both bearing plates 1, 2 do not require the roller tracks for the both-end conical rollers K, K, . . . (those corresponding to pockets h, i in FIG. 28), and the number of both-end conical rollers K, K, . . . is increased, the bearing structure is simplified, and manufacturing is easy.

The other structures and actions are same as in embodiment 1.

Embodiment 3

Figure 12:
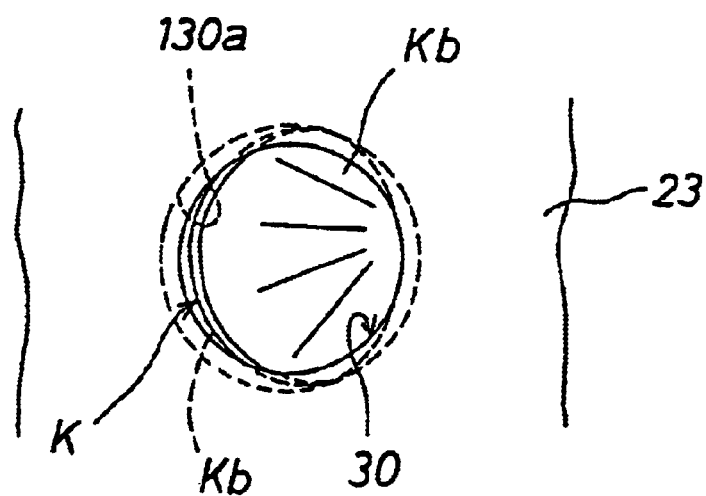
FIG. 12(a) is a magnified plan view showing a holding unit structure of both-end conical roller of a scroll thrust bearing in embodiment 3 of the invention.
FIG. 12(b) is a magnified sectional view showing the holding unit structure of both-end conical roller of the scroll thrust bearing.
Figure 12:
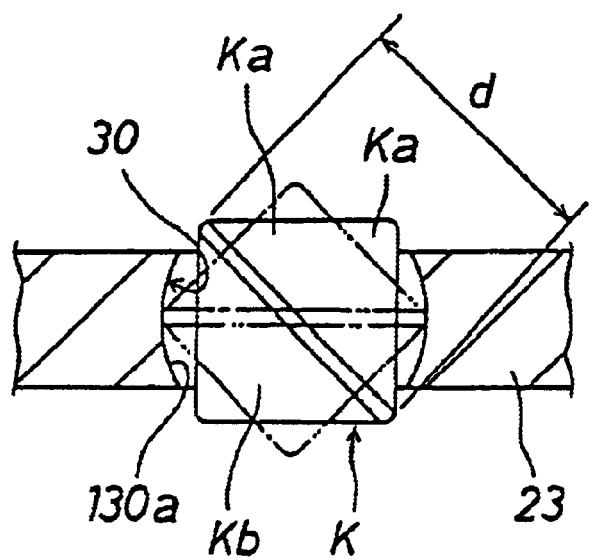

This embodiment is shown in FIG. 12. The scroll thrust bearing of the embodiment is modified in the structure of the roller holding pockets 30 for holding the both-end conical rollers K.

That is, the roller holding pocket 30 of the embodiment is a pocket hole penetrating from upper to lower side of the holding plate 23 same as in embodiment 2 as shown in FIG. 12, but the inside is a holding space of a spherical surface 130a having a slightly larger diameter than the maximum diameter d of the both-end conical roller K.

The other structures and actions are same as in embodiment 2.

Embodiment 4

Figure 13A:
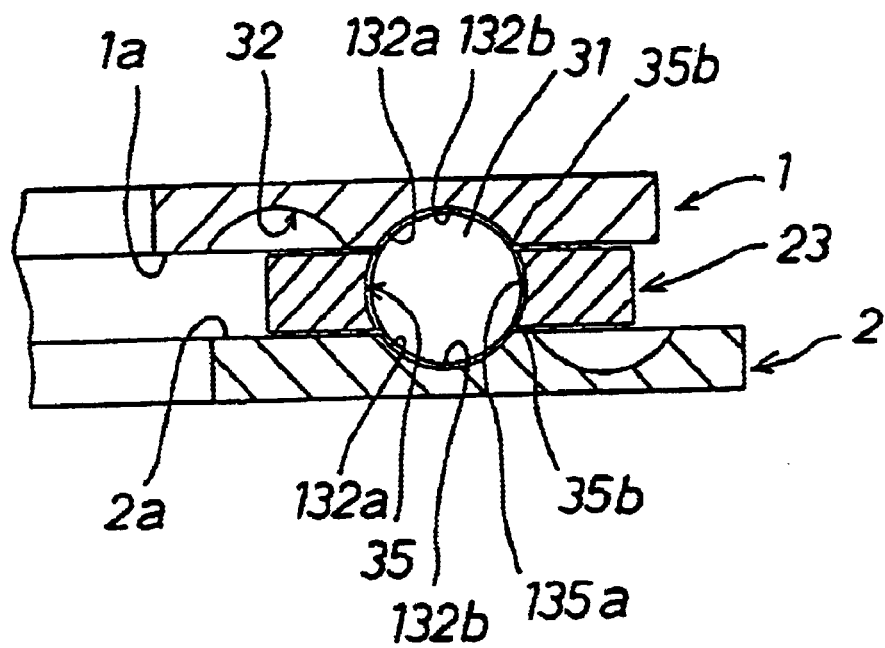
FIG. 13(a) is a sectional view showing a rotation preventive mechanism of a scroll thrust bearing in embodiment 4 of the invention.
Figure 13B:
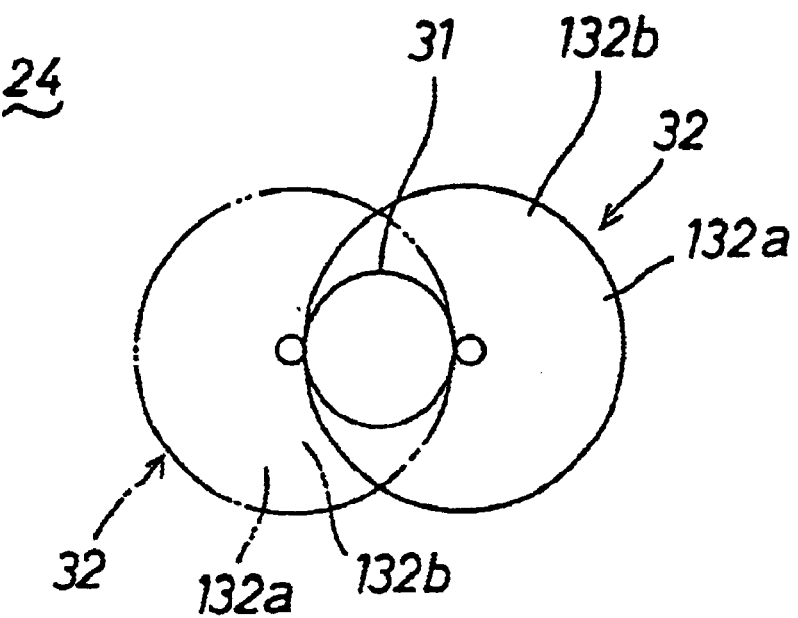
FIG. 13(b) is a plan view showing the rotation preventive mechanism of the scroll thrust bearing by a partially virtual line.

This embodiment is shown in FIG. 13. The scroll thrust bearing of the embodiment is modified in the structure of the rotation preventive mechanism 24.

In the rotation preventive mechanism 24 of the embodiment, the inside of the ball pocket 35 of the holding plate 23 is a spherical surface 135a having a slightly larger diameter than the outside diameter of the rolling ball 31, and is designed to hold almost slidably on the outer circumference of the rolling ball 31.

The ball tracks 32, 32 provided in the both bearing plates 1, 2 are annular grooves for allowing the rolling balls 31 to roll, and the sectional shape of the ball track 32 is an arc section having a curvature corresponding to the curvature of the outer circumference of the rolling ball 31 (see FIG. 13(a)) Therefore, the annular track engaged with the rolling balls 31, that is, the outer side 132a of the ball track 32 is a concave arc coinciding nearly with the outer surface of the rolling ball 31. The bottom 132b of the ball track 32 is set at a proper depth so as not to contact with the rolling ball 31 same as in embodiment 2.

The other structures and actions are same as in embodiment 2.

Embodiment 5

Figure 14A:
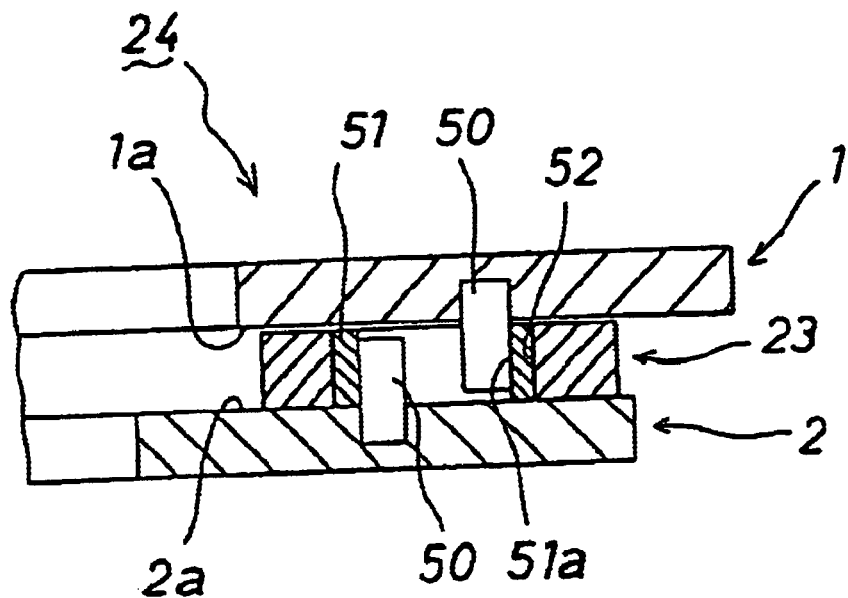
FIG. 14(a) is a sectional view showing a rotation preventive mechanism of a scroll thrust bearing in embodiment 5 of the invention.
Figure 14B:
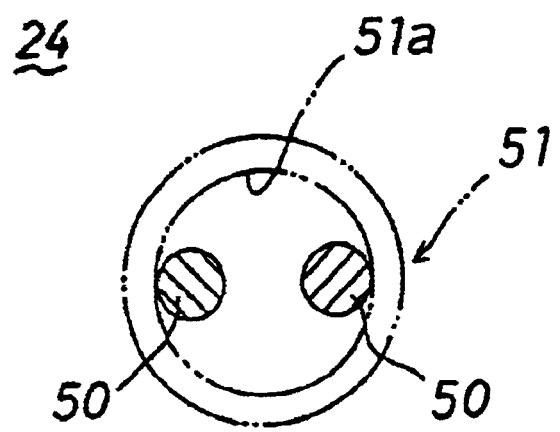
FIG. 14(b) is a plan view showing the rotation preventive mechanism of the scroll thrust bearing by a partially virtual line.

This embodiment is shown in FIG. 14. The scroll thrust bearing of the embodiment is modified in the structure of the rotation preventive mechanism 24 same as in embodiment 4.

The rotation preventive mechanism 24 of the embodiment comprises a pair of swirl pins 50, 50 provided respectively in the both bearing plates 1, 2, and a swirl hole 51a penetrating through the holding plate 23.

The swirl pins 50, 50 are columnar bars fixed in parallel upright state oppositely to the both bearing plates 1, 2. The mutually confronting pair of swirl pins 50, 50 are combined with the both bearing plates 1, 2 so as to be positioned in an eccentric state by the portion of the radius (=generator length of conical surfaces Ka, Kb) on the swirl circle of the both-end conical roller K (see outer contour circle of planes m, n in FIG. 28(b)).

The swirl hole 51a is formed of a cylindrical ring. That is, a cylindrical hole is opened in the holding plate 23, and a cylindrical ring 51 is held in the cylindrical hole. The cylindrical inside of the cylindrical ring 51 forms the swirl hole 51a.

The cylindrical ring 51 is a metal piece for preventing wear or seizure of the swirl pins 50, 50 and cylindrical hole of the holding plate 23 due to direct sliding on each other. The cylindrical ring 51 is slidably held in the cylindrical hole of the holding plate 23. The opposing pair of swirl pins 50, 50 of the both bearing plates 1, 2 are composed to be slidably engaged with the cylindrical inside 51a of the cylindrical ring 51.

As the pair of swirl pins 50, 50 slide and are guided on the cylindrical inside 51a, the both bearing plates 1, 2 relatively swirl in the same tracking as the swirl circle of the both-end conical rollers K.

The other structures and actions are same as in embodiment 2.

Embodiment 6

Figure 15A:
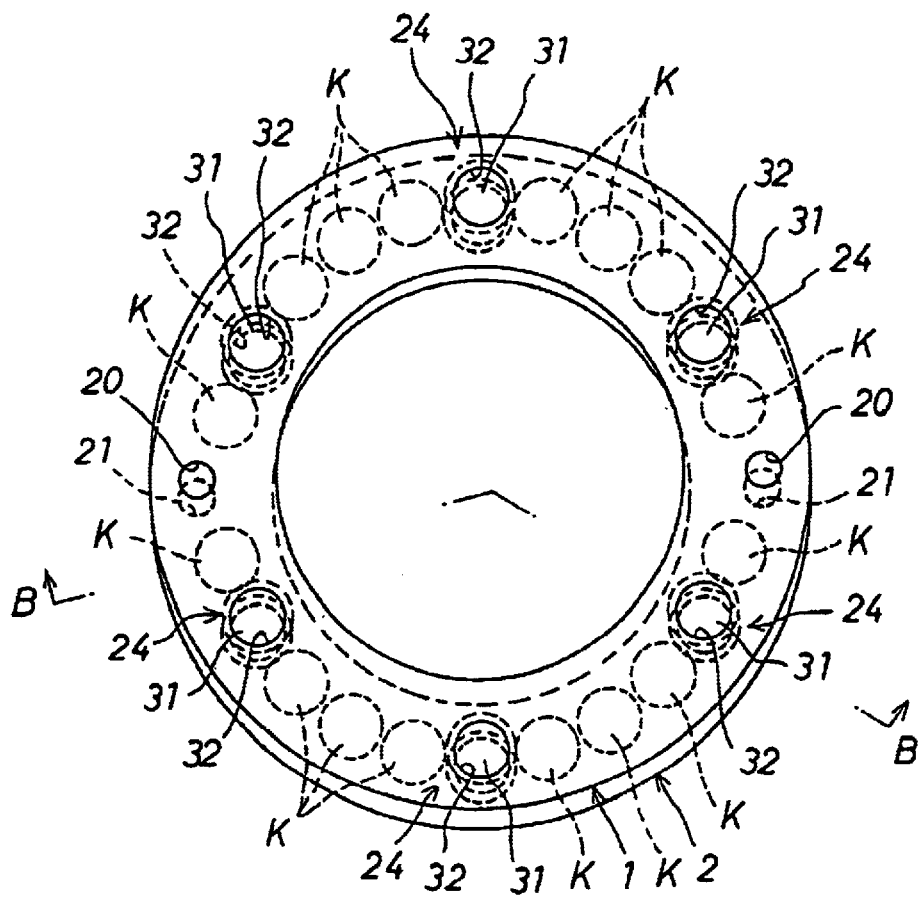
FIG. 15(a) is a plan view showing a scroll thrust bearing in embodiment 6 of the invention.
Figure 15B:
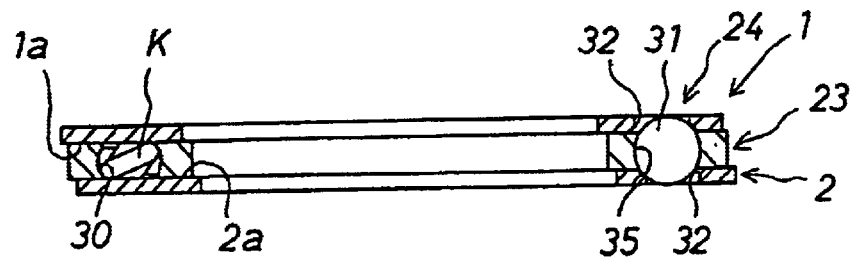
FIG. 15(b) is a sectional view along line B—B in FIG. 15(a) showing the scroll thrust bearing.
Figure 15C:
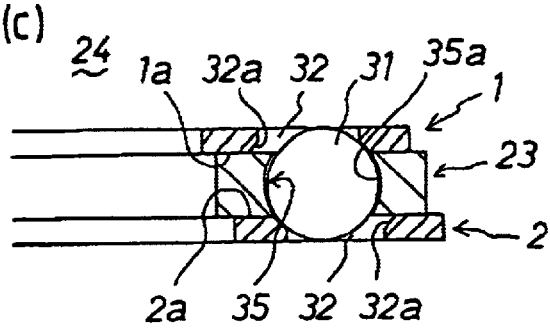
FIG. 15(c) is a magnified sectional view of rotation preventive mechanism of the scroll thrust bearing.
Figure 16A:
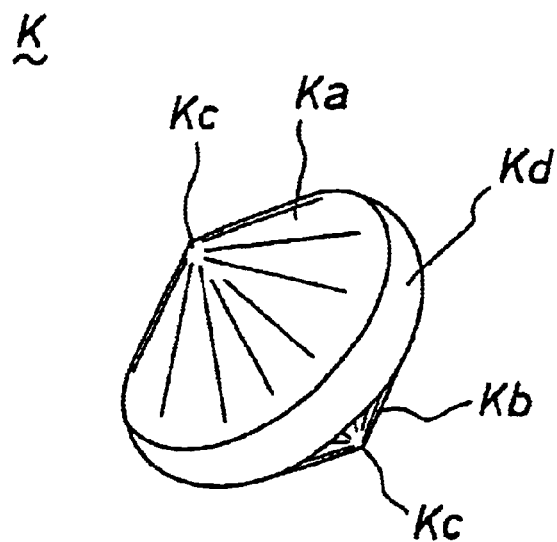
FIG. 16(a) is a perspective view of both-end conical roller of the thrust bearing.
Figure 16B:
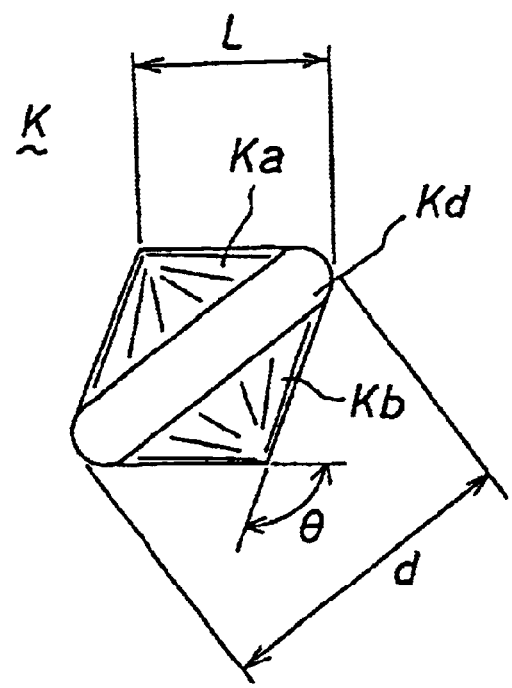
FIG. 16(b) is a front view of both-end conical roller of the thrust bearing.

This embodiment is shown in FIG. 15 and FIG. 16. The scroll thrust bearing of the invention is a modified example of embodiment 2. That is, in embodiment 2, both-end conical rollers K, K, . . . are arranged in two rows in dual row configuration, but this embodiment is a single row configuration of the both-end conical rollers K, K, . . . arranged in one row at specific intervals in the circumferential direction.

The structure of the both-end conical roller K of the embodiment is a flat shape as compared with embodiment 2. More specifically, the ratio H/R is set at about 2.1 in the both-end conical roller K, and the apex angle formed by upper and lower apexes of the both-end conical roller K, that is, the conical angle θ is about 130°, and hence the intersection angle of the both conical surfaces Ka, Kb is set at about 130°.

Further, in the rotation preventive mechanism 24, the pair of ball tracks 32, 32 provided in the both bearing plates 1, 2 are track holes penetrating from upper to lower side of the bearing plates 1, 2. The inside of the track hole 32 is an annular track 32*a* engaged with the rolling ball 31 as shown in FIG. 15(*c*). The annular track 32*a* is a taper surface spreading widely toward the in inside opening. The outside opening of the track hole 32 has a slightly smaller diameter than the maximum diameter d of the both-end conical roller K (see FIG. 16). Thus, the both-end conical roller K is held so as not to drop out of the track hole 32.

The other structures and actions are same as in embodiment 2.

Embodiment 7

Figure 17A:
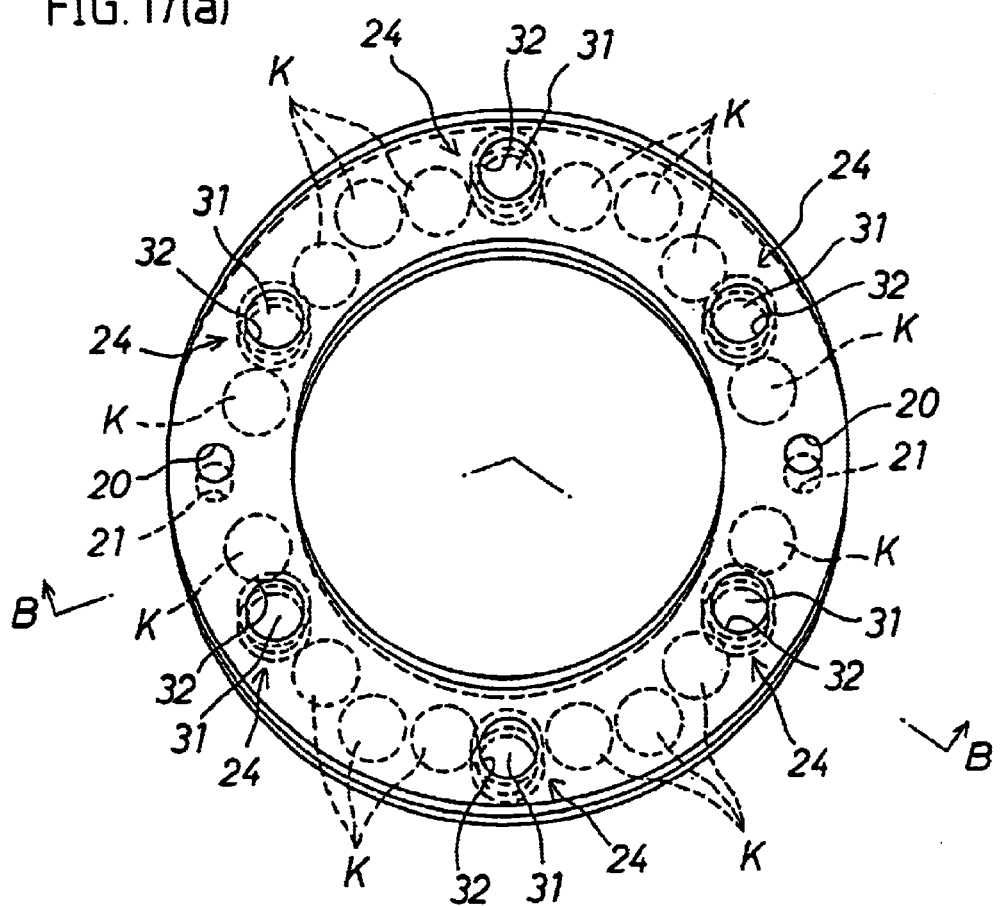
FIG. 17(a) is a plan view showing a scroll thrust bearing in embodiment 7 of the invention.
Figure 17B:
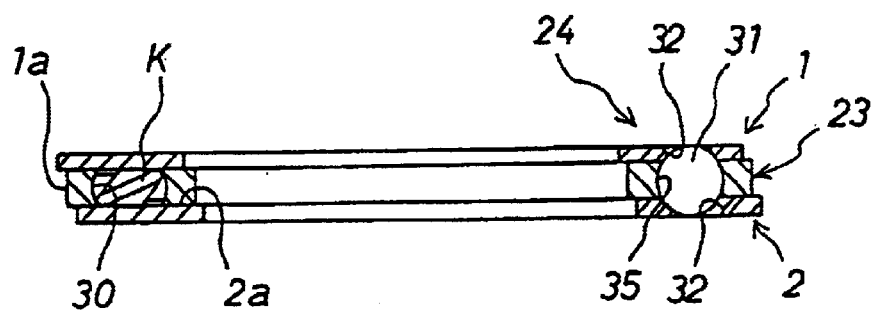
FIG. 17(b) is a sectional view along line B—B in FIG. 17(a) showing the scroll thrust bearing.
Figure 17C:
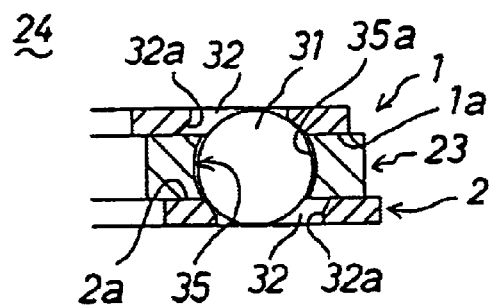
FIG. 17(c) is a magnified sectional view of rotation preventive mechanism of the scroll thrust bearing.

This embodiment is shown in FIG. 17. The scroll thrust bearing of the embodiment is slightly modified from embodiment 6. That is, in the embodiment, the both-end conical rollers K, K, . . . are slightly deviated in the diameter direction alternately in a single row zigzag layout as shown in FIG. 17(*a*).

The other structures and actions are same as in embodiment 6.

Embodiment 8

This embodiment is shown in FIG. 18 to FIG. 21. In the scroll thrust bearing of the embodiment, a plurality of (nine in the illustrated example) of track pockets 3, 4 are disposed oppositely in the pair of parallel bearing plates 1, 2, and both-end conical rollers K are rotatably held in the opposing pair of track pockets 3, 4.

The both bearing plates 1, 2 are guaranteed to swirl relatively and smoothly by the rolling motion of the both-end conical rollers K and the action of the swirl defining mechanism (swirl defining means) 60. The both bearing plates 1, 2 are formed in a unit structure being linked and held so as not to separate from each other by a plate linking mechanism 61 as the plate linking means.

The bearing plates 1, 2 are identical in structure. For example, the upper side bearing plate 1 is an integral laminate fixed structure of a track plate 67 and a holding plate 68.

Figure 19A:
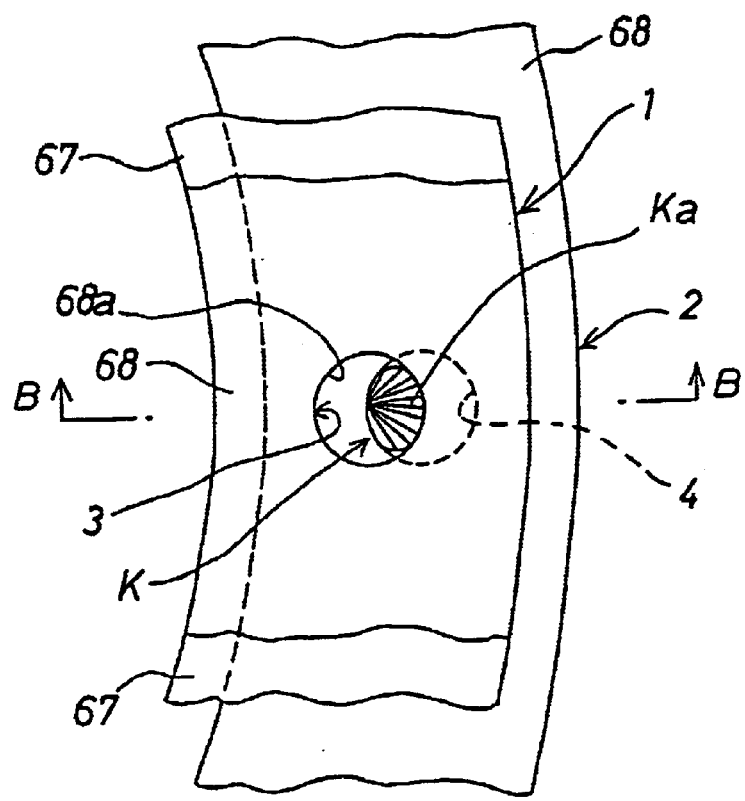
FIG. 19(a) is a partially cut-away magnified plan view showing a holding structure of both-end conical bearing of the thrust bearing.
Figure 19B:
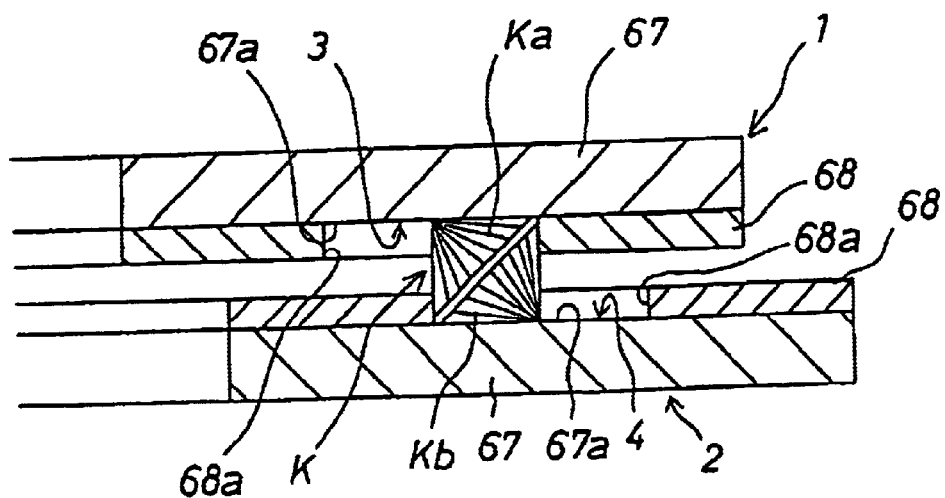
FIG. 19(b) is a sectional view along line B—B in FIG. 19(a) showing the holding structure of both-end conical bearing of the thrust bearing.

The track plate 67 is an annular flat plate, and its inside 67*a* (see FIG. 19(*b*)) is a flat track forming surface. The holding plate 68 is an annular flat plate having the same inside and outside diameter of the track plate 67. The annular holding plate 68 has a plurality of (nine in the example) pocket forming holes 68*a*, 68*a*, . . . provided at equal intervals in the circumferential direction in the central part of the diameter direction, that is, the width direction thereof.

The track plate 67 and holding plate 68 are integrally laminate and fixed, and the track forming surface 67*a* of the track plate 67 and the pocket forming holes 68*a*, 68*a*, . . . of the holding plate 68 form the track pockets 3 (4).

Figure 18A:
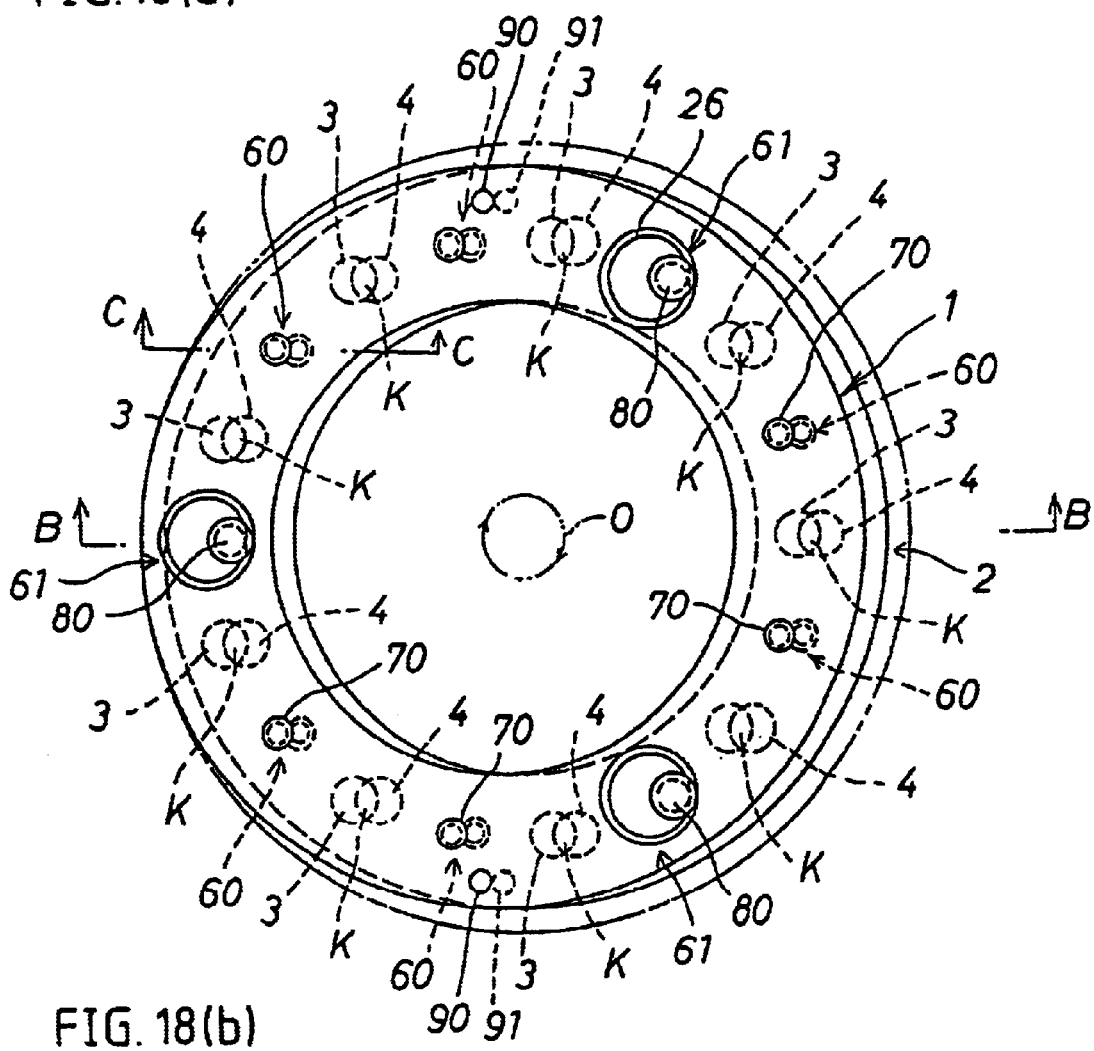
FIG. 18(a) is a plan view showing a scroll thrust bearing in embodiment 8 of the invention.
Figure 18B:
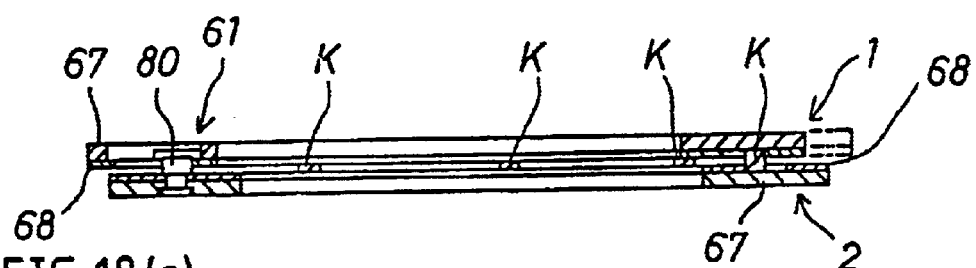
FIG. 18(b) is a sectional view along line B—B in FIG. 18(a) showing the scroll thrust bearing.
Figure 18C:
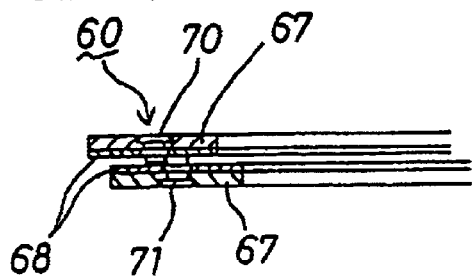
FIG. 18(c) is a sectional view along line C—C in FIG. 18(a) showing the scroll thrust bearing.

The inner surface of the track pockets 3, 4, that is, the inner surface of the pocket forming hole 68*a* is a cylindrical surface having the same diameter as the swirl circle of the both-end conical roller K (see outer circle of planes m, n in FIG. 28(*b*)). The inner surfaces of the opposing pair of track pockets 3, 4 of the both bearing plates 1, 2 are disposed in a state eccentric by the portion of the radius of the swirl circle of the both-end conical roller K in a plane view as shown in FIG. 18(*a*) and FIG. FIG. 19(*a*). In a plane view, in the holding hole of a nearly elliptical shape formed by overlapping of the both inner surfaces of the track pockets 3, 4, the both-end conical rollers K are guided and held so as to be free to roll.

The both conical surfaces Ka, Kb of the both-end conical roller K are rolling surfaces finished by polishing. One conical surface Ka of the both-end conical roller K rolls on the track of the track pocket 3 of the bearing plate 1, that is, on the bottom, and the other conical surface Kb rolls on the track of the track pocket 4 of the bearing plate 2, that is, on the bottom.

Figure 20:
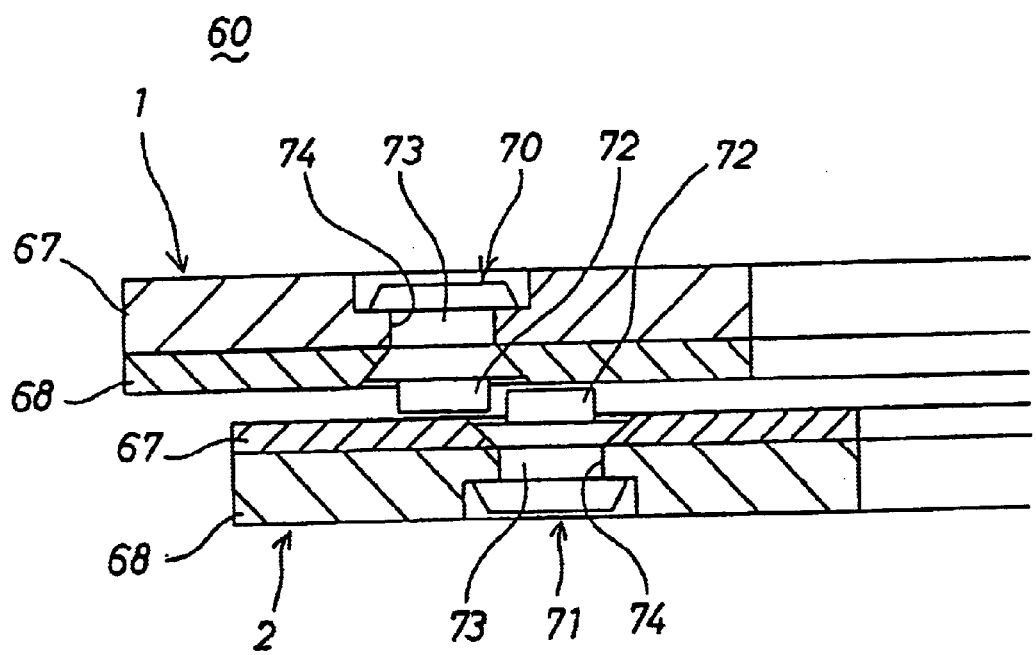
FIG. 20 is a magnified sectional view of swirl-definition mechanism of the thrust bearing.

The swirl defining mechanism 60 is, specifically as shown in FIG. 20, a pair of swirl pins 70, 71 fixed on the bearing plates 1, 2, respectively. In the illustrated example, the swirl defining mechanism 60 is disposed at three positions at equal intervals in the peripheral direction as shown in FIG. 18(*a*) (three equal divisions).

The pair of swirl pins 70, 71 are identical in structure. For example, one swirl pin 70 is made of a rigid metal material such as stainless steel, and has a swirl shaft 72 having a cylindrical surface.

These swirl pins 70, 71 and swirl shafts 72, 72 are disposed to slide on each other, and the distance between the axial centers is set depending on the swirl radius of the both bearing plates 1, 2. That is, in the illustrated embodiment, the radius of the swirl shafts 72, 72 of the pair of swirl pins 70, 71 is set at ½ of the swirl radius.

The relative configuration of the both swirl pins 70, 71 to the configuration of the track pockets 3, 4 and both-end conical rollers K is set so that the swirl shafts 72, 72 of the swirl pins 70, 71 may slide on each other rotatably relatively in the same tracking as the swirl circle of the both-end conical roller K.

Accordingly, the both bearing plates 1, 2 are guided and supported in a relatively swirling state in the same tracking as the swirl circle, by means of the sliding action of the swirl pins 70, 71 (eccentric amount reduction preventive function) and rolling of the both-end conical roller K (eccentric amount expansion preventive function). A certain slight gap is formed between the swirl shafts 72 and 72 of the swirl pins 70, 71. This slight gap is set according to the shape and dimension of the both-end conical roller K.

The mounting structure of the swirl pins 70, 71 is, as shown in FIG. 3, a rivet structure having the mounting shaft 73 of the base end portion crimped and fixed on the bearing plates 1, 2. That is, the mounting shaft 73 penetrates and is engaged from inside with the penetration hole 74 of the bearing plates 1, 2, and is crimped and fixed from outside of the bearing plates 1, 2, so that the swirl pins 70, 71 are fixed in an upright state to the inside of the bearing plates 1, 2. The mounting shaft 73 of the both swirl pins 70, 71 also has the function of laminating and fixing integrally the track plate 67 and holding plate 68, and this structure is suited to automatic assembling.

The plate linking mechanism 61 is to link and hold the clearance between the pair of bearing plates 1, 2 in a specified range. That is, with the both-end conical rollers K, K, . . . interposed between the both bearing plates 1, 2, these bearing plates 1, 2 are linked and held in a relatively swirling state by means of the plate linking mechanism 61.

Figure 21:
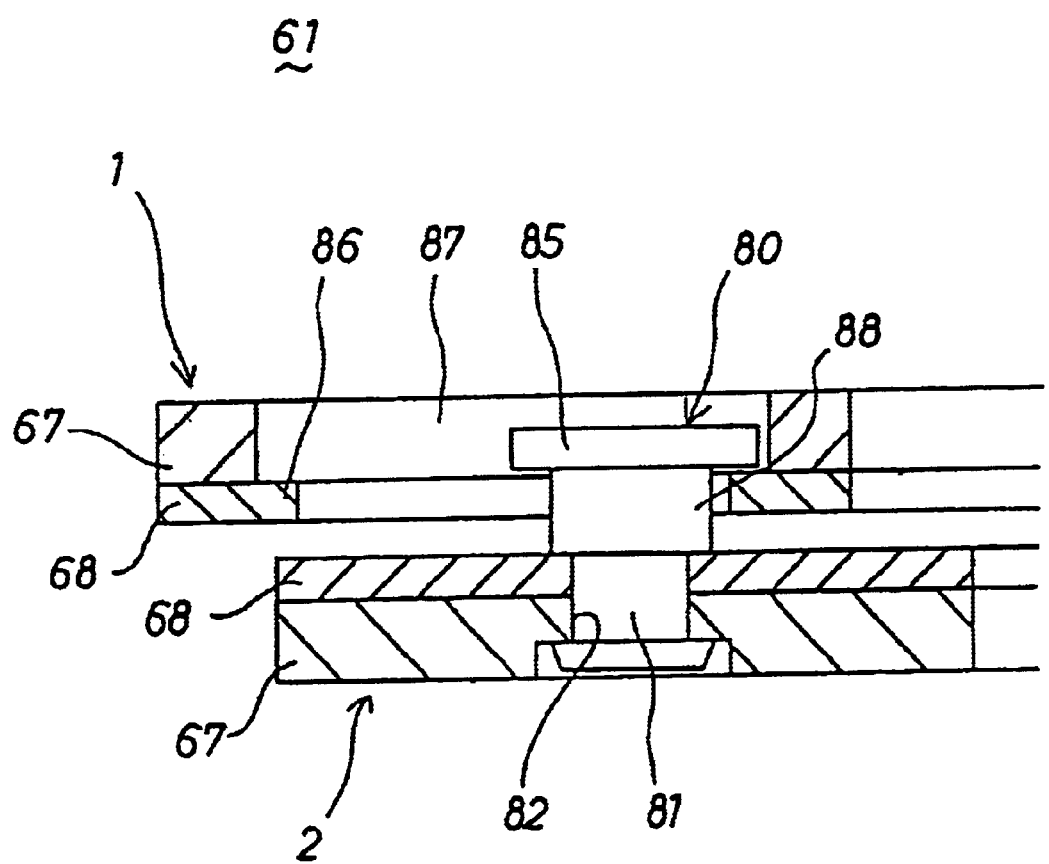
FIG. 21 is a magnified sectional view of plate linkage mechanism of the thrust bearing.

This plate linking mechanism 61 is formed as a linking pin 80 which is fixed in either one of the both bearing plats 1, 2, and engaged with the other. The shown plate linking mechanism 61 is disposed at the positions between the swirl defining mechanism 60, 60, at two positions each at equal intervals, in a total of six positions as shown FIG. 18(a). More specifically, the linking pin 80 is formed of a rigid metal material such as stainless steel. The linking pin 80 is fixed to the lower side bearing plate 2 as shown in FIG. 21, and is engaged with the upper side bearing plate 1.

The mounting structure of the linking pin 80 to the lower side bearing plate 2 is same as the mounting structure of the swirl pins 70, 71 mentioned above. That is, the mounting structure of the linking pin 80 is, as shown in FIG. 21, a rivet structure having the mounting shaft 81 of the base end of the linking pin 80 crimped and fixed to the bearing plate 2. In other words, the mounting shaft 81 penetrates from inside into a penetration hole 82 of the bearing plate 2 and is engaged, and is crimped and fixed from the outside of the bearing plate 2, so that the linking pin 80 is mounted and fixed in an upright state at the inside of the bearing plate 2. The mounting shaft 81 of the linking pin 80 also has a function of laminating and fixing integrally the track plate 67 and holding plate 68, and has a structure suited to automatic assembling.

The engaging structure of the linking pin 80 and the upper side bearing plate 1 is a structure for preventing separation of the both bearing plates 1, 2 in the axial direction, while allowing relative swirl motion of the both bearing plates 1, 2.

More specifically, the engaging structure of the linking pin 80 and the bearing plate 1 is composed of a disk-shaped outward engaging flange 85 provided at the leading end of the linking pin 80, and an engaging hole 87 having a disk-shaped inward engaging flange 86 provided in the bearing plate 1.

The outward engaging flange 85 is formed integrally by projecting to the outside in the diameter direction, at the leading end of a linking shaft 88 for defining the clearance of the both bearing plates 1, 2. The inward engaging flange 86 is projecting from the inner side of the engaging hole 87 to the inside in the diameter direction. Specifically, the inward engaging flange 86 is formed or an engaging plate 68 for composing the bearing plate 1. The shape and dimension of the inward engaging flange 86 are defined according to the swirl radius of the both bearing plates 1, 2.

Corresponding to the relative swirl portion of the both bearing plates 1, 2, the linking pin 80 is disposed in an eccentric relation so that the outward engaging flange 85 and inward engaging flange 86 may be always engaged with each other in the axial direction in the engaging hole 87.

That is, the relative configuration of the linking pin 80 and engaging hole 87 is determined in relation to the configuration of the track pockets 3, 4 and the both-end conical roller K and the configuration of the both swirl pins 70, 71. As a result, not only when the both bearing plates 1, 2 are stopped, but also when swirling relatively as mentioned above, the outward engaging flange 85 of the linking pin 80 and the inward engaging flange 86 of the engaging hole 87 can be always engaged in the axial direction of the linking pin 80, so that the assembled state of the both bearing plates 1, 2 is maintained.

In the scroll thrust bearing having such constitution, in the track pockets 3, 4 of the pair of bearing plates 1, 2, the both-end conical rollers K roll on the track of the track pockets 3, 4, that is, on the bottom, while the both conical surfaces Ka, Kb are guided by the inner side of the track pockets 3, 4 of the bearing plats 1, 2 respectively. By the rolling motion of the both-end conical rollers K and the action of the swirl defining mechanism 60, the relative and smooth swirl of the both bearing plates 1, 2 is assured, while relative rotation of the bearing plates 1, 2 is arrested.

In other words, the both-end conical rollers K roll on the track, and swirl on the apex of the both conical surfaces Ka, Kb as shown in FIG. 28(a). At this time, the track pockets 3, 4 are disposed in a phase being eccentric by the length of generator of the conical surfaces Ka, Kb of the both-end conical roller K. Accordingly, the rolling motion of the both-end conical roller K is restrained by the inner side of the track pockets 3, 4, or is guided in the defined state, so that the correct position of the both-end conical rollers K is maintained. As a result, one bearing plate 1 does not rotate relatively on the other bearing plate 2, and swirls in an eccentric state by the portion nearly equal to the length of the generator of the conical surfaces Ka, Kb of the both-end conical roller K (see arrow o in FIG. 18(a)).

Moreover, the both-end conical roller K rolls on the track without slipping at all while keeping a correct linear contact state between the bearing plates 1, 2 swirling by eccentricity. Accordingly, the scroll thrust bearing obtains an ideal and perfect rolling contact state as the rolling bearing, so that the rigidity and life are enhanced remarkably.

In this case, the pair of bearing plates 1, 2 are linked and held in a relatively swirling state by means of the plate linking mechanism 61. Accordingly, the both-end conical rollers K held in the track pockets 3, 4 of the both bearing plates 1, 2 are stably maintained in the held state all the time without disturbing or loosening the configuration in any environment such as vibration or the like. Thus, the rolling motion of the both-end conical rollers K is smooth, and it is easy to carry and handle as a single part of bearing or assemble into the device swirl unit.

Besides, for the ease of assembling into the device swirl unit, such as the scroll swirl unit in the scroll type compressor, for example, as shown in FIG. 18, the bearing plates 1, 2 have the positioning parts 90, 91 to be engaged with the fixed side or swirl side positioning part (not shown) of the device swirl unit to be assembled in. These positioning parts 90, 91 are specifically positioning holes, and the positioning parts of the device swirl unit formed as positioning pins are inserted and engaged in these positioning holes 90, 91.

The plate linking mechanism 61 and the swirl defining mechanism 60 are independently responsible for the function of defining the relative swirl portion of the both bearing plates 1, 2, and the function of linking and holding the clearance of the two bearing plates 1, 2 within a specified range. Therefore, the pair of swirl pins 70, 71 for composing the swirl defining mechanism 60 are in a simplified shape as shown, and the outside diameter of the swirl shaft 12 can be set in a large size. As a result, if the swirl radius of the bearing plates 1, 2 is small, the rigidity of the swirl pins 70, 71 can be maintained sufficiently.

Embodiment 9

Figure 22A:
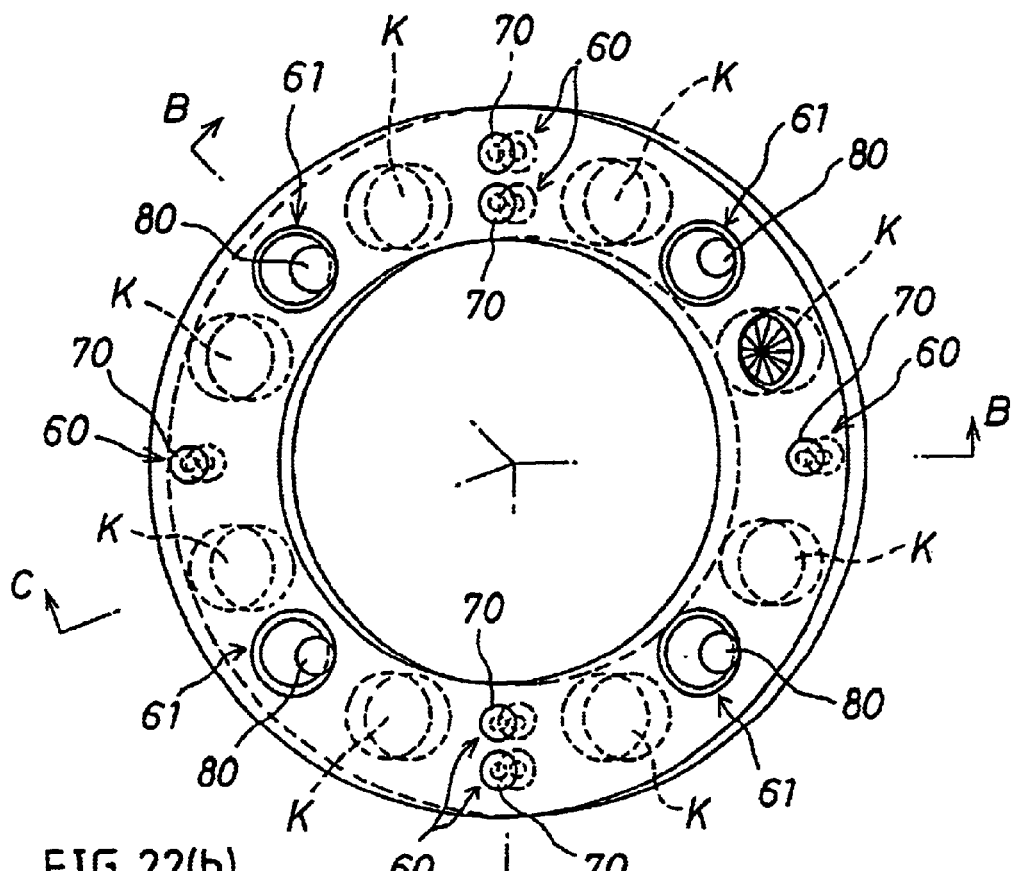
FIG. 22(a) is a plan view showing a scroll thrust bearing in embodiment 9 of the invention.
Figure 22B:
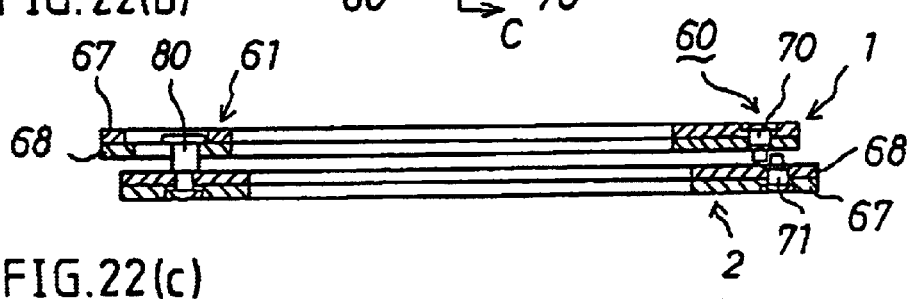
FIG. 22(b) is a sectional view along line B—B in FIG. 22(a) showing the scroll thrust bearing.
Figure 22C:
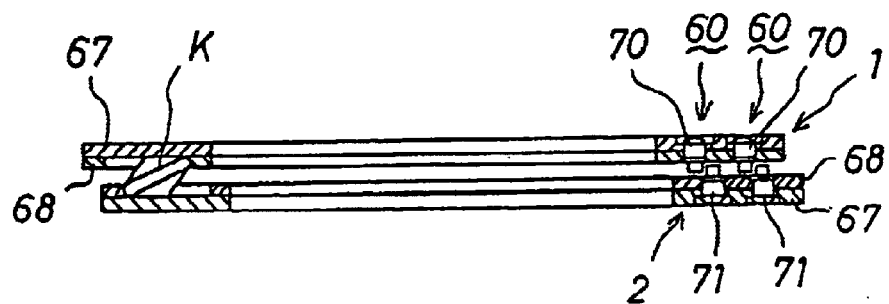
FIG. 22(c) is a sectional view along line C—C in FIG. 22(a) showing the scroll thrust bearing.

This embodiment is shown in FIG. 22. The scroll thrust bearing of the embodiment is slightly modified from the scroll thrust bearing in embodiment 8. That is, in this embodiment, the configuration (number and position of setting) of the both-end conical rollers K, swirl defining mechanism 60, plate linking mechanism 61 is modified.

The structure of the both-end conical rollers K of the embodiment is same as in embodiment 6, and H/R is set at about 2.1.

The other structures and actions are same as embodiment 8.

Embodiment 10

Figure 23A:
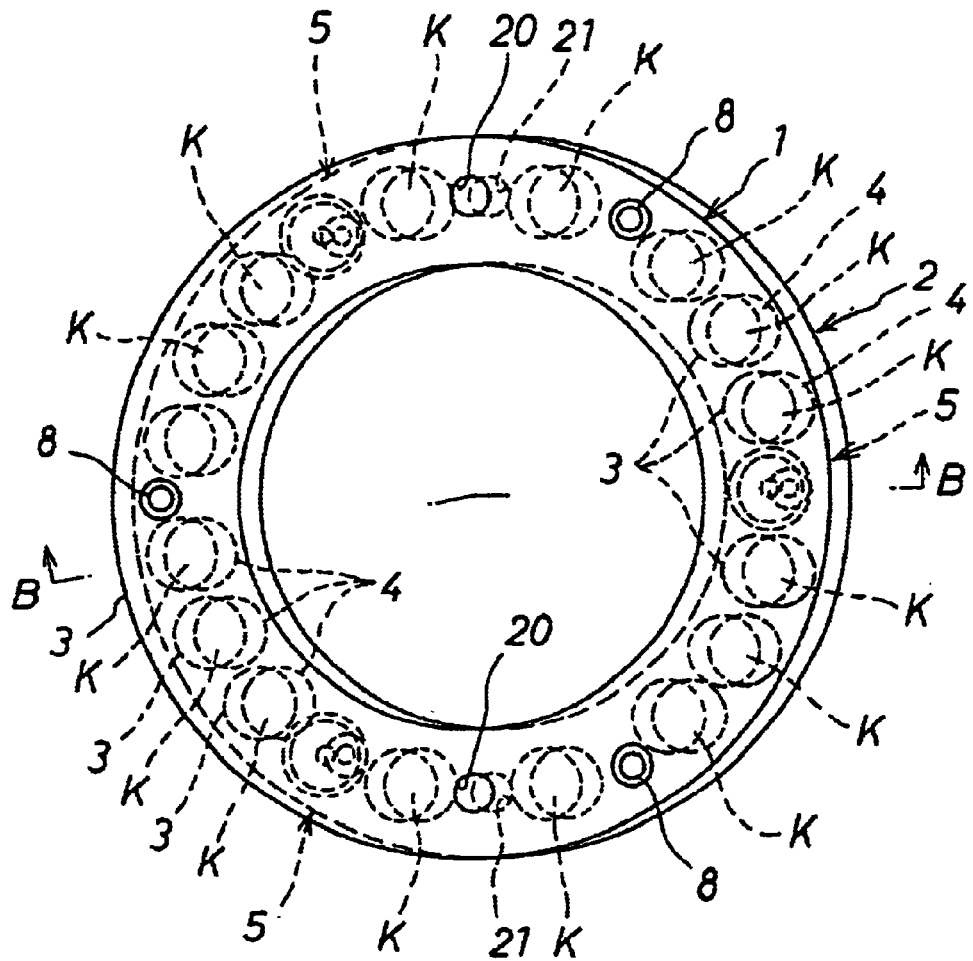
FIG. 23(a) is a plan view showing a scroll thrust bearing in embodiment 10 of the invention.
Figure 23B:
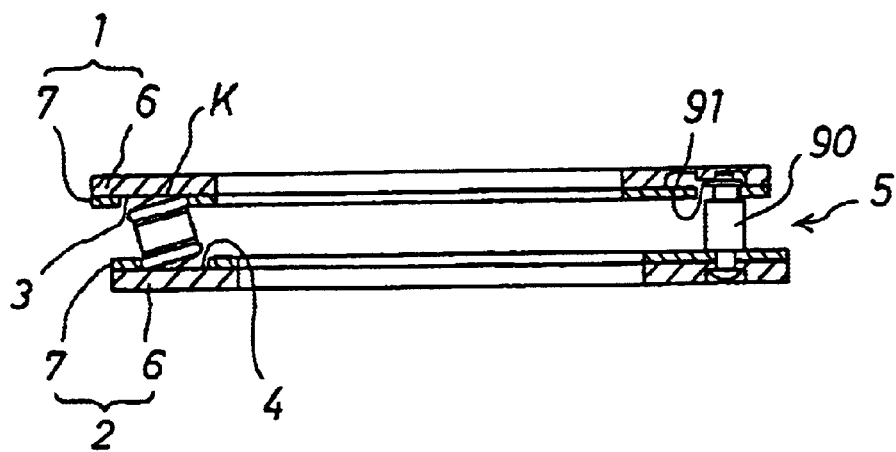
FIG. 23(b) is a sectional view along line B—B in FIG. 23(a) showing the scroll thrust bearing.
Figure 24A:
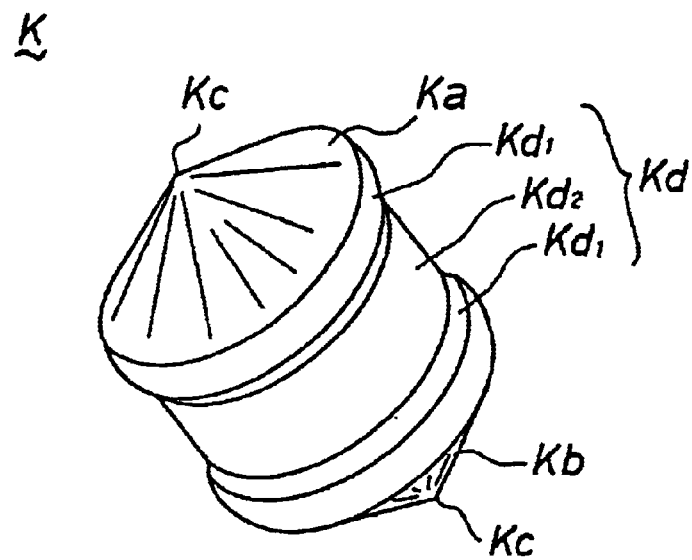
FIG. 24(a) is a perspective view of double-end conical roller of the scroll-thrust bearing.
Figure 24B:
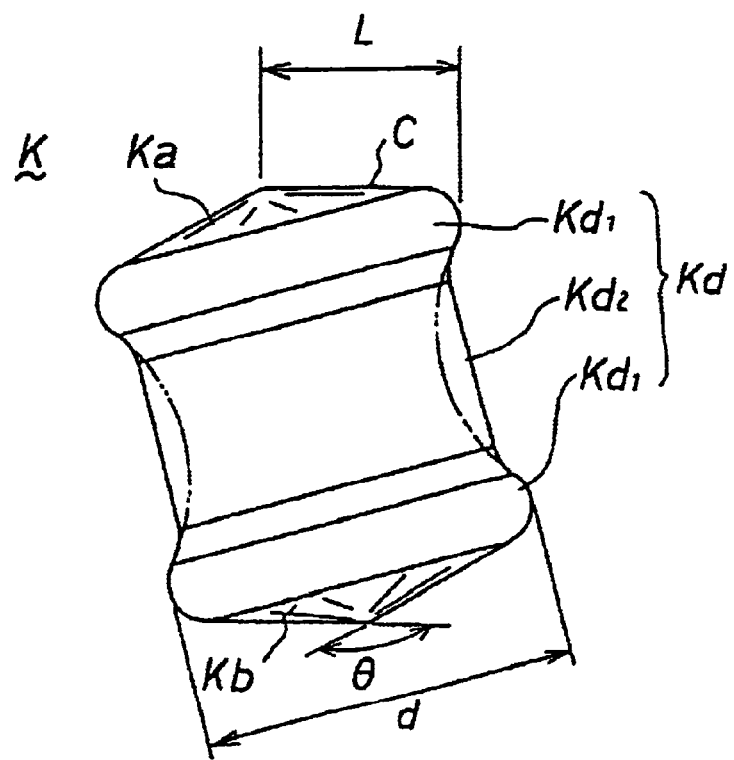
FIG. 24(b) is a front view of double-end conical roller of the scroll thrust bearing.
Figure 25A:
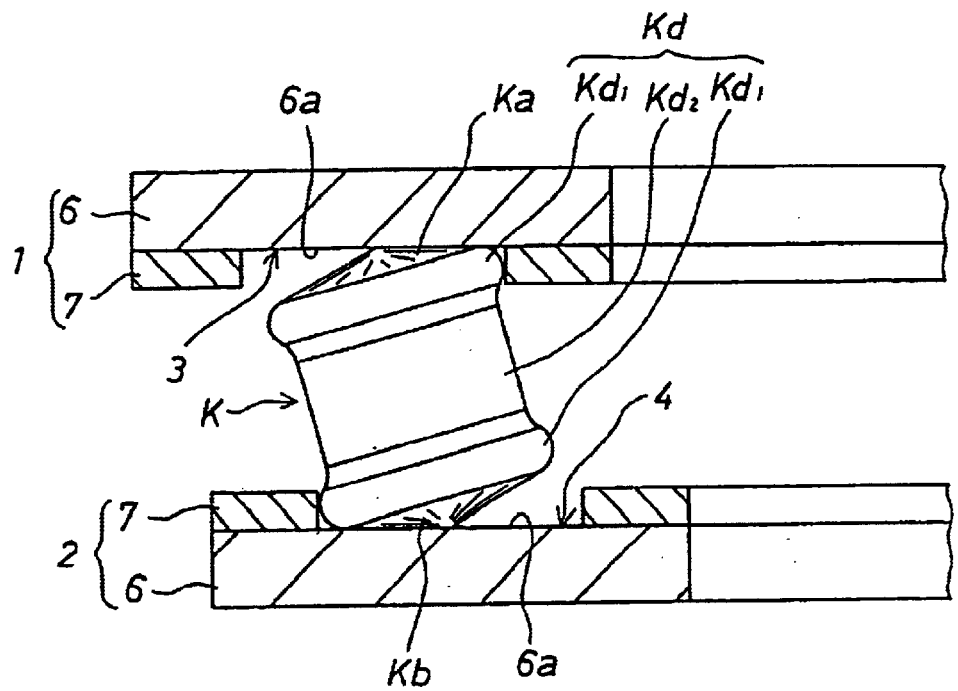
FIG. 25(a) is a magnified sectional view of holding mechanism of both-end conical roller which is an essential part of the thrust bearing.
Figure 25B:
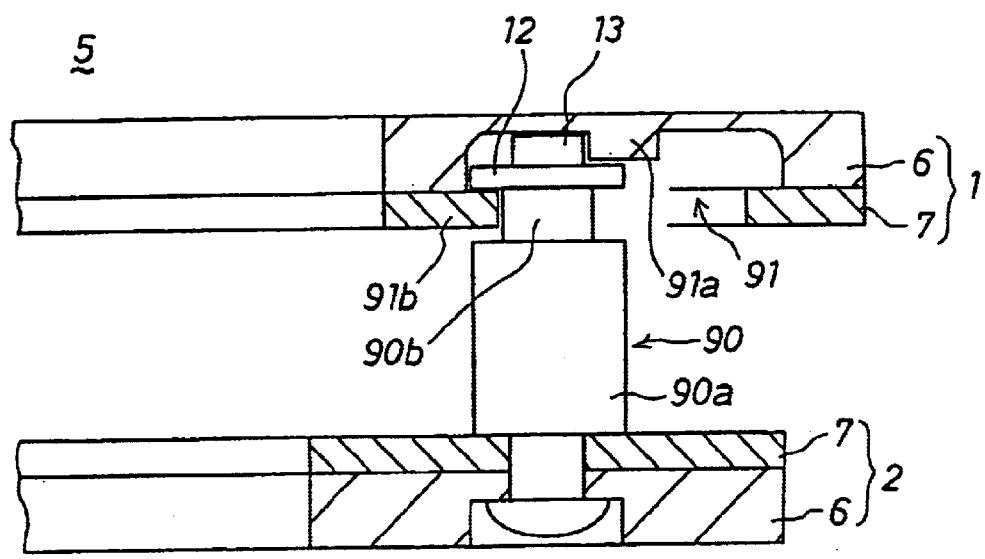
FIG. 25(b) is a magnified sectional view of linkage mechanism of both-end conical roller which is also an essential part of the thrust bearing.

This embodiment is shown in FIG. 23 to FIG. 25. The scroll thrust bearing of the embodiment is slightly modified from the scroll thrust bearing in embodiment 1, and specifically the structure of the both-end conical rollers K and linking mechanism 5 is modified.

That is, in the structure of the both-end conical rollers K of the embodiment, as shown in FIG. 24, H/R is set larger than in embodiment 1 or embodiment 2. Specifically, the H/R is about 4.9, and hence the apex angle, that is, the conical angle θ formed by upper and lower apexes of the both-side conical roller K is about 150°, and the intersection angle of the both conical surfaces Ka, Kb is set at about 150°.

Accordingly, the bonded bottom Kd of the both-end conical roller K is provided with a clearance for avoid interference with the inner side of the track pockets 3, 4 of the both bearing plates 1, 2. That is, the bonded bottom Kd of the both-end conical roller K is composed of arc section portions $Kd_1$, $Kd_1$ consecutive to the both conical surfaces Ka, Kb, and a clearance recess $Kd_2$ disposed between these portions $Kd_1$, $Kd_1$. The outside diameter of the clearance recess $Kd_2$ is set slightly smaller than the maximum diameter d of the both-end conical roller K within a range of maintaining the required strength of the both-end conical roller K.

The linking mechanism 5 is, as shown in FIG. 24, composed of a linking pin 90 fixed in the lower side bearing plate 2, and a linking recess 91 provided in the upper side bearing plate 1 corresponding to the linking pin 90.

The linking pin 90 is crimped and fixed to the bearing plate 2 at the base end portion of the main body 90a, and is mounted and fixed in an upright sate at the inner side of the bearing plate 2. At the leading end position of the linking pin 90, a swirl shaft 13 and an engaging flange 12 at the axial base end side of this swirl shaft 13 are provided. An inserting portion 90b is disposed between the engaging flange 12 and the main body 90a.

The linking recess 91 is large enough to rotatably accommodate the leading end portion of the linking pin 90. Inside of the linking recess 91, a swirl pin 91a is provided to slide rotatably on the swirl shaft 13 of the linking pin 90. An opening 91b of the liking recess 91 is formed as a fastening flange, and its size is slightly smaller than the outside diameter of the engaging flange 12 of the linking pin 90.

Accordingly, the both bearing plates 1, 2 are prevented from separating in the axial direction by the engagement of the linking pin 90 and linking recess 91. The both bearing plates 1, 2 are held in a relatively rotatable state in the same tracking as the swirl circle, by the swirl rolling of the both-end conical rollers K.

The other structures and actions are same as in embodiment 1.

Embodiment 11

Figure 26A:
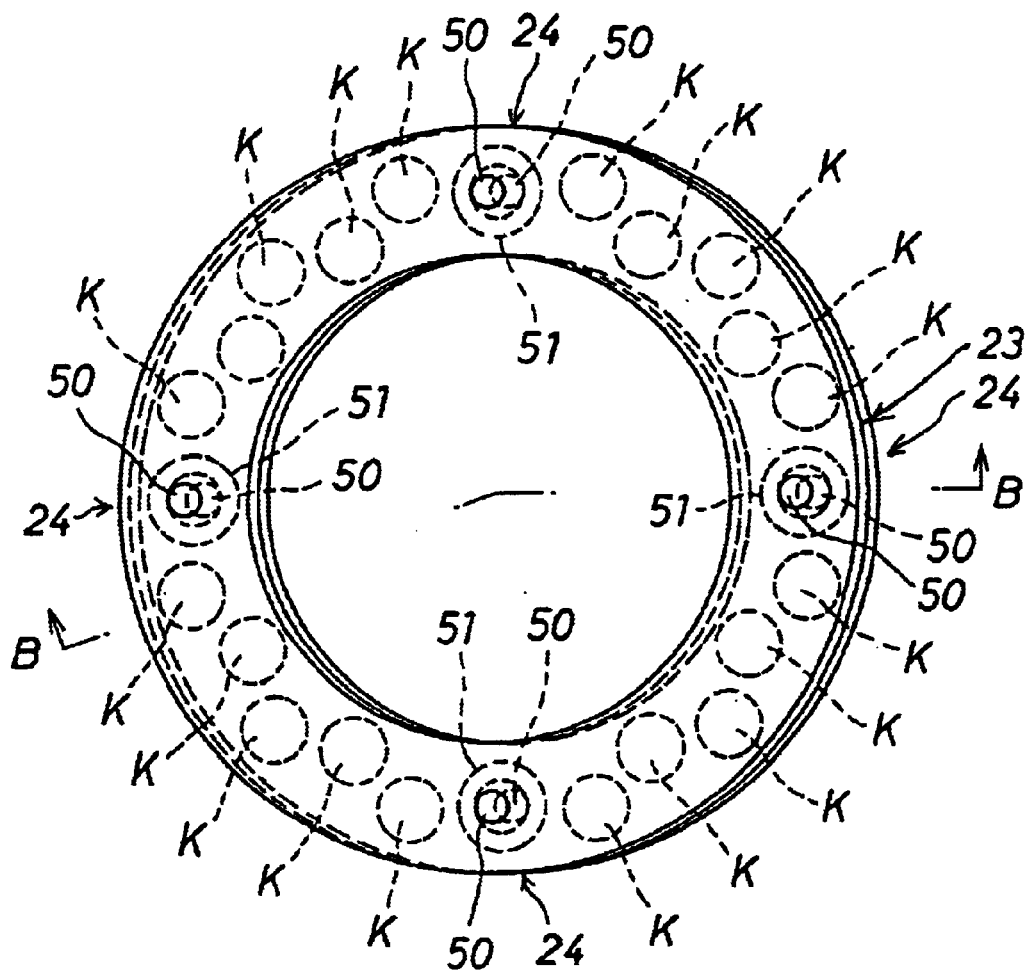
FIG. 26(a) is a plan view showing a scroll thrust bearing in embodiment 11 of the invention.
Figure 26B:
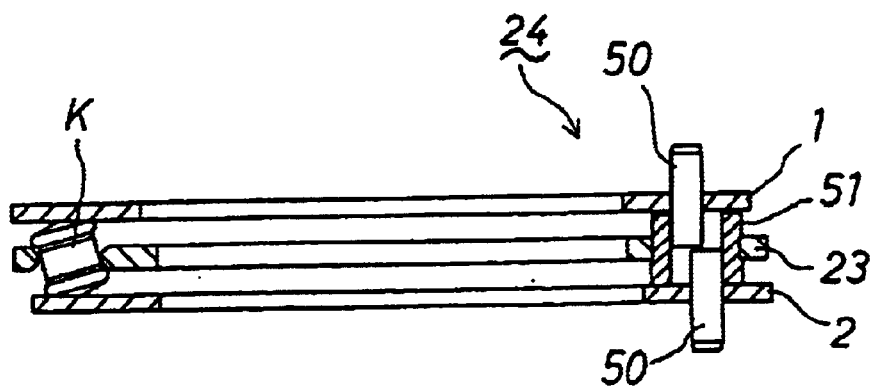
FIG. 26(b) is a sectional view along line B—B in FIG. 26(a) showing the scroll thrust bearing.

The embodiment is shown in FIG. 26 and FIG. 27. The scroll thrust bearing of the embodiment is, same as in embodiment 2, of the type having the holding plate 23, and the structure of the both-end conical roller K same as in embodiment 10. In the embodiment, as shown in FIG. 26(a), the layout of the both-end conical rollers K, K, . . . is a single row structure of zigzag layout slightly deviated alternately in the radial direction same as in embodiment 7.

That is, the structure of the both-end conical roller K of the embodiment is same as in embodiment 10, and H/R is about 4.9, and in this regard the structure of the roller holding pocket 30 of the holding plate 23 corresponds to the both-end conical roller K.

Figure 27A:
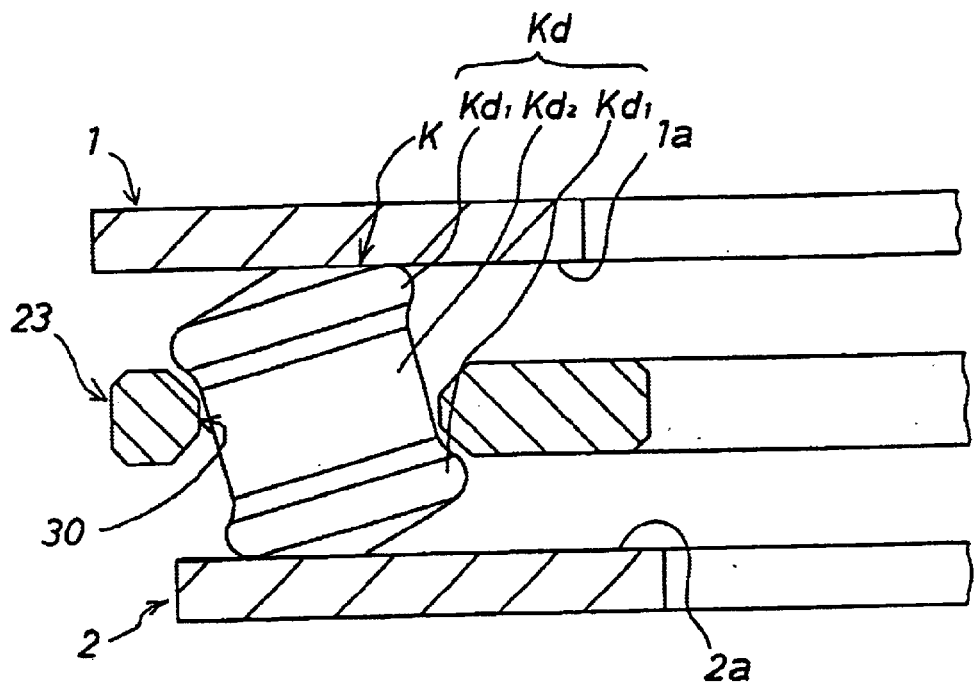
FIG. 27(a) is a magnified sectional view of holding mechanism of both-end conical roller which is an essential part of the thrust bearing.

Specifically, the roller holding pocket 30 is, as shown in FIG. 27(a), a pocket hole penetrating through both sides of the holding plate 23. This pocket hole 30 is a circular hole as shown in the drawing, and the inside diameter of the circular hole is set slightly larger than the junction plane of the both-end conical roller K, that is, the outside diameter of the clearance recess $Kd_2$ of the bonded bottom Kd, and slightly smaller than the maximum diameter d of the both-end conical roller K. The both sides of this circular hole 30 are taper surfaces spreading widely to both ends of the holding plate 23 as shown in drawing, in a shape so as to avoid interference with the both-end conical roller K.

Figure 27B:
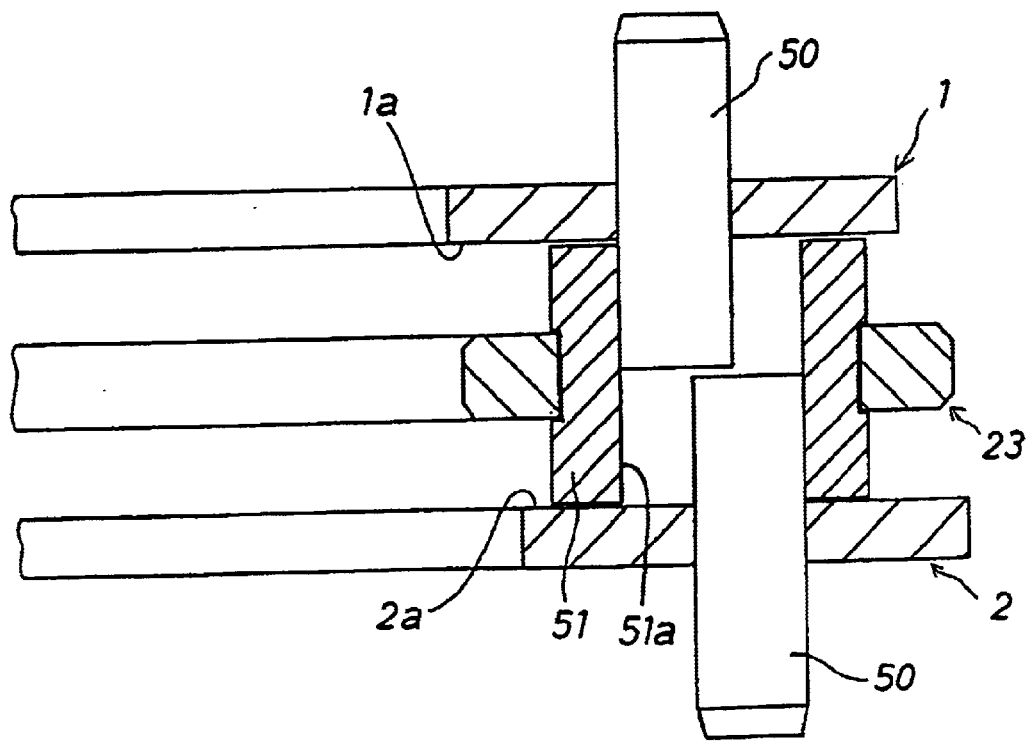
FIG. 27(b) is a magnified sectional view of rotation preventive mechanism of both-end conical roller which is also an essential part of the thrust bearing.

The rotation preventive mechanism 24 is basically same as in embodiment 5 (see FIG. 14). However, the swirl pins 50, 50 are different as shown in FIG. 27(b), that is, the outer ends project to the outside of the both bearing plates 1, 2, and the projecting portions also serve as positioning parts of the bearing plates 1, 2. In other words, the projecting outer ends of the swirl pins 50, 50 are, although not shown, inserted and engaged in the positioning holes provided in the device swirl unit to be assembled in, for example, the scroll swirl unit in the scroll type compressor.

As a result, with the outer ends of the swirl pins 50, 50 inserted and engaged in the positioning holes of the device swirl unit, the configuration of the roller bearing is maintained. Thus, relative and smooth swirl motion of the bearing plats 1, 2 is assured.

The other structures and actions are same as in embodiment 2.

In the foregoing embodiments, further, the following modifications may be also possible.

(1) The specific shape and dimensions of the both-end conical rollers R such as the apex angle of the conical surfaces Ra, Rb are not limited to the illustrated embodiments alone. That is, the specific shape of the both-end conical roller R is designed and changed appropriately in consideration of the swirl route of the device swirl unit in which the roller bearing is assembled, such as the scroll swirl unit of the scroll type compressor within the range of satisfying the basic condition (1<H/R<5).

(2) The structure of other parts and elements for composing the bearing is not limited to the illustrated embodiments, but may be set properly depending on the purpose.

(3) The shape of the clearance recess $Kd_2$ provided in the bonded bottom Kd of the both-end conical roller K is not limited to the embodiment. For example, the shape of the clearance recess $Kd_2$ may be properly changed in a range of maintaining the required strength of the both-end conical roller K, such as recess arc section as indicated by twin dot chain line in FIG. 24(b).

As described herein, according to the scroll thrust bearing of the invention, the both-end conical roller is composed of a conical element having a pair of conical surfaces matched coaxially, and is designed to keep the relation of the scroll swirl radius (R) and the distance (H) between opposite tracks of both bearing plates in a range of 1<H/R<5, so that the life of the both-end conical roller and the life of the scroll thrust bearing can be notably extended.

That is, since the shape and dimensions of the both-end conical rollers are designed to satisfy the above relation, as compared with the preset scroll swirl radius (R) of the both-end conical roller, the section curvature in the contact portion with the tracks of the both bearing plates of the conical surfaces of the both-end conical roller is as small as possible in a practical range. As a result, the surface pressure (pressure per unit area) acting on the conical surfaces of the both-end conical roller is as small as possible, and a sufficient practical strength is assured. It has been experimentally known that the life of the both-end conical roller is extended by more than 10 times when the ratio of H/R is doubled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A scroll thrust bearing having a plurality of both-end conical rollers rotatably held between a pair of parallel bearing plates,
    wherein a plurality of track pockets are oppositely provided in the pair of bearing plates, the both-end conical rollers are rotatably held in the opposing pair of track pockets, respectively,
    said both-end conical rollers are composed of conical bodies having a pair of conical surfaces matched coaxially, and a relation of the scroll swirl radius (R) and a dimension (H) between opposite tracks of the both bearing plates is set in a relation of 1<H/R<5, and
    a clearance for avoiding interference with the inside of the track pockets is provided in the both-end conical rollers.

2. The scroll thrust bearing of claim 1,
    wherein said pair of conical surfaces of the both-end conical roller are bonded at the bottom, and the bonded bottom of the both conical surfaces has a junction surface including an arc section continuous to the both conical surfaces, so that the contact length in a generator direction of the both conical surfaces to the track on the both bearing plates is set to be as small as possible.

3. The scroll thrust bearing of claim 2,
    wherein said clearance for avoiding interference with the inside of the track pockets is provided in the bonded bottom of the both-end conical rollers.

4. The scroll thrust bearing of claim 1,
    wherein the conical surface of the both-end conical roller is processed by crowning.

5. The scroll thrust bearing of claim 4,
    wherein the load applied to the conical surfaces of the both-end conical rollers is set to be biased to the larger diameter side of the conical surfaces.

6. The scroll thrust bearing of claim 5,
    wherein said track pocket has a cylindrical inner surface of the same inside diameter as the swirl circle of the both-end conical roller, and a flat track surface on which the both-end conical rollers roll,
    the both-end conical rollers held in pair of track pockets confronting the pair of bearing plates are allowed to roll on the track of one track pocket at one conical surface, while the other conical surface rolls on the track of the other track pocket.

7. The scroll thrust bearing of claim 1,
    wherein the pair of bearing plates are linked and held by linking means in a relatively swirling state.

8. The scroll thrust bearing of claim 7,
    wherein said linking means is composed of a linking pin fixed to either one bearing plate of the both bearing plates, and a linking recess disposed in other bearing plate, corresponding to the linking pin to be engaged with this linking pin,
    said linking pin has a swirl shaft at its leading end, and an engaging flange at the axial direction base end side of this swirl shaft,
    said linking recess has a swirl pin rotatably sliding on the swirl shaft of the linking in its inside, and an opening of said linking recess is formed as a fastening flange of a smaller diameter than an outside diameter of the engaging flange of the linking pin,
    whereby the both bearing plates are held in a relatively rotatable state in the same tracking as the swirl circle of the both-end conical roller.

9. The scroll thrust bearing of claim 7,
    wherein said track pocket has an inner side of same inside diameter as the swirl circle of the both-end conical roller, the inner sides of the opposing pair of track pockets are disposed in an eccentric state by the portion of the radius of the swirl circle of the both-end conical roller mutually in plane view, and the both-end conical rollers are guided and held in nearly elliptical holding holes formed by overlaying these inner sides.

10. The scroll thrust bearing of claim 1,
    wherein the pair of bearing plates have positioning parts to be engaged with a fixed side or swirl side positioning part of the device swirl unit to the assembled in.

* * * * *